(12) United States Patent
Loce et al.

(10) Patent No.: US 7,518,618 B2
(45) Date of Patent: Apr. 14, 2009

(54) ANTI-ALIASED TAGGING USING LOOK-UP TABLE EDGE PIXEL IDENTIFICATION

(75) Inventors: Robert P. Loce, Webster, NY (US); Beilei Xu, Penfield, NY (US); Stuart A. Schweid, Pittsford, NY (US); Son H. Nguyen, Rolling Hills Estates, CA (US); Michael Branciforte, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 202 days.

(21) Appl. No.: 11/317,782

(22) Filed: Dec. 23, 2005

(65) Prior Publication Data

US 2007/0146386 A1 Jun. 28, 2007

(51) Int. Cl.
G09G 5/00 (2006.01)

(52) U.S. Cl. ................ 345/611; 345/596; 382/266; 382/269

(58) Field of Classification Search ............. 345/611; 382/266
See application file for complete search history.

(56) References Cited

U.S. PATENT DOCUMENTS

| | | | |
|---|---|---|---|
| 4,638,369 A * | 1/1987 | Hsieh | 358/447 |
| 5,138,339 A | 8/1992 | Curry et al. | |
| 5,485,289 A | 1/1996 | Curry | |
| 5,949,910 A * | 9/1999 | Go | 382/233 |
| 6,144,461 A | 11/2000 | Crean et al. | |
| 6,167,166 A | 12/2000 | Loce et al. | |
| 6,181,438 B1 | 1/2001 | Bracco et al. | |
| 6,243,499 B1 | 6/2001 | Loce et al. | |
| 6,449,396 B1 * | 9/2002 | Loce et al. | 382/276 |
| 6,606,420 B1 | 8/2003 | Loce et al. | |
| 6,763,141 B2 | 7/2004 | Xu et al. | |
| 6,775,410 B1 | 8/2004 | Loce et al. | |
| 7,280,121 B2 * | 10/2007 | Nakahashi et al. | 345/611 |
| 7,369,136 B1 * | 5/2008 | Heckbert et al. | 345/582 |
| 2005/0129328 A1 | 6/2005 | Saber et al. | |

OTHER PUBLICATIONS

Robert P. Loce et al., U.S. Appl. No. 11/317,818, filed simultaneously herewith, entitled "Edge Pixel Identification". Filed Dec. 23, 2005.
Robert P. Loce et al., U.S. Appl. No. 11/317,427, filed simultaneously herewith, entitled "Corner Sharpening Using Look-Up Table Edge Pixel Identification". Filed Dec. 23, 2005.
Robert P. Loce et al., U.S. Appl. No. 11/318,131, filed simultaneously herewith, entitled "Tinted Edge Enhancement Using Look-Up Table Edge Pixel Identification". Filed Dec. 23, 2005.
Purdum et al., U.S. Appl. No. 10/973,725, filed Oct. 26, 2004, entitled "Tinted Edge Enhancement Using Harmonic Halftones for the Boundary Pixels". Filed Oct. 26, 2004.
Richard Rubinstein, *Digital Typography: An Introduction to Type and Composition for Computer System Design*, Addison-Wesley Publishing Company, Reading, MA, Copyright 1988, pp. 78-80.

* cited by examiner

*Primary Examiner*—Antonio A Caschera
(74) *Attorney, Agent, or Firm*—Fay Sharpe LLP

(57) ABSTRACT

The teachings provided herein disclose an image processing method for rendering a digital image possessing anti-aliased pixels by selecting a target pixel location within the digital image; observing a set of pixels within a pixel observation window superimposed on the digital image relative to the target pixel location; generating edge-state codes for a plurality of pairs of neighboring vectors of pixels within the pixel observation window; generating edge-identification codes from the plurality of edge-state codes using at least one look-up table; and, utilizing the edge-identification codes to select and apply to the digital image at the target pixel either anti-aliased rendering or conventional halftoning. The anti-aliasing may employ pixel signals that are high addressable and directionally biased to a particular orientation.

10 Claims, 12 Drawing Sheets

ANTI-ALIASED TAGGING USING LOOK-UP TABLE EDGE PIXEL IDENTIFICATION

CROSS-REFERENCE TO COPENDING APPLICATIONS

Attention is directed to copending Applications co-filed at the same time with the present Application: U.S. application Ser. No. 11/317,818, entitled "EDGE PIXEL IDENTIFICATION"; U.S. application Ser. No. 11/317,427, entitled "CORNER SHARPENING USING LOOK-UP TABLE EDGE PIXEL IDENTIFICATION"; and U.S. application Ser. No. 11/318,131, entitled "ENHANCED HALFTONE EDGES USING LOOK-UP TABLE EDGE PIXEL IDENTIFICATION". The disclosure found in each of these copending applications is hereby incorporated by reference in its entirety.

CROSS-REFERENCE TO RELATED APPLICATIONS

Cross reference is made to the following applications, the disclosures of each of which are totally incorporated by reference herein: US Publication No. 2005/0129328, entitled "CORNER SHARPENING OF TEXT AND LINE ART IN A SUPER RESOLUTION ANTI-ALIASING IMAGE PATH," to E. Saber, R. Loce, filed Dec. 15, 2003. The appropriate components and processes of the above co-pending application may be selected for the invention of the present application in embodiments thereof.

BACKGROUND AND SUMMARY

The present disclosure relates to a methodology for rendering anti-aliased pixels in a digital image. More specifically, this disclosure relates to anti-aliased pixel identification and rendering via look-up table based edge detection.

Anti-aliasing in the context of digitizing line art and certain graphical image structures is best known as a method of using intermediate levels of intensity to achieve subpixel position of edges for several reasons including reduction or elimination of jaggies on the edges of lines and polygons, including text. As used herein the term anti-aliased is intended to refer to those segments or regions of an image that are effected by an anti-aliasing operation applied to the image (e.g. an image processing operation or a physical process resulting in gray pixels along the edges of line art or text). Jaggies are primarily visible at the edges of sloped lines approaching horizontal or vertical. The term anti-aliasing suggests an analog term aliasing, normally representing the presence of low frequencies resulting from sampling high frequency signals at too low a sampling rate.

Consider a near-vertical (or near-horizontal) line segment. To be perfectly reproduced in a printed media, the phase, which represents the location of the edge, must continuously vary along the length of a segment. Due to the inherent sampling of a bi-level display or printed output, the phase exhibits jump discontinuities. Thus, this form of aliasing artifact, leads to an induced jagged appearance where the structures are referred to jaggies. Within a sampled image any graphical object is eventually approximated as a polygon or collection of polygons. These polygons have straight edges some of which will exhibit aliasing (jaggies and other placement defects). FIG. 11 for example shows aliasing in two dimensions. When the triangle on the top of FIG. 11 is rasterized, the edges are aliased as reproduced in the triangle shown at the bottom of FIG. 11. In particular, the position along the bottom edge should move up slightly from column to column as one looks from left to right in the image at the bottom of FIG. 11. However, the position is quantized, as illustrated, producing the jagged appearance along the bottom of the triangle. Visibility of the anti-aliased image artifacts is increased by the regular nature of the jaggies, again a result of sampling.

Consider the following systems and their capability, or incapability, to utilize anti-aliased pixels. Xerox's Docucolor 40, for example, employs a high frequency analog line screen to render anti-aliased pixels, but that is not an option for some products or marked segments. When conventional screens (e.g., approximately equal to 130-150 CPI dots) are employed in a rendering module, anti-aliased pixels are halftoned and printed, resulting in objectionable halftone dots positioned along character edges. Hyperacuity printing techniques, for example those described by Curry, et al. (U.S. Pat. No. 5,138,339 and U.S. Pat. No. 5,485,289) can provide rendering for anti-aliased pixels which is compatible with simultaneously printing dot screen halftones in enhanced line art. However, these techniques require the use of tags to identify the anti-aliased pixels as anti-aliased line art.

Anti-aliased images can be generated by capturing the image at a resolution greater than the final or desired output resolution, then reducing the resolution of the image by sub-sampling using an averaging process. A major benefit of anti-aliased images is that high contrast, saturated objects are surrounded with pixels possessing intermediate values that visually suggest the true, higher resolution position of object edges.

For example, in binary printing systems, such as many xerographic or ink jet systems that use a halftoning process to simulate continuous tone images, these anti-aliased edge pixels should be rendered with a very high frequency cell, ideally one having the resolution of the final output image. If the standard system halftone dot were to be used, the anti-aliased edges would be serrated or jagged at the standard halftone frequency. This rendering would reduce or even negate any value obtained through anti-aliasing. The use of a very high frequency screen over the entire anti-aliased image renders the anti-aliased pixel properly, but tends to sharpen the tonal curve and provoke print quality defects in the overall image.

To optimally render anti-aliased pixels, it is beneficial to recognize pixels as anti-aliased or not anti-aliased. Since anti-aliasing primary affects pixels that are at the edges of image objects, recognition can be framed as a specific type of edge identification task.

An edge within an image is a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

Two key properties of an edge are strength and orientation. Edge strength is a measure of the contrast of an edge. A black typographic character on a white background produces stronger edges than a gray character on a white background. Edge orientation can be described by a variety of measures, such as angle quantified in degrees or by classes such as vertical, horizontal, and diagonal.

Other attributes of edges are also useful to image analysis and image processing. For instance, classification of combined edges, such as corners, has been used in object recognition and in image enhancement applications. Edge thickness is a measure that provides information on the breadth of a local contrast change and can indicate a degree of blur in an image, see for example: U.S. Pat. No. 6,763,141, entitled "ESTIMATION OF LOCAL DEFOCUS DISTANCE AND GEOMETRIC DISTORTION BASED ON SCANNED IMAGE FEATURES," to inventors B. Xu, R. Loce, which is hereby incorporated in its entirety for its teachings. Inner edges and outer edges refer to regions just inside of or just outside of a given object, respectively, and have been used in applications such as character stroke thinning and thickening. The presence or absence of an edge is an edge-related property that has been used in applications such as image classification and recognition. Distance from an edge is also an edge-related property that has been used in image enhancement applications.

Edge detection in digital image processing typically employs a collection of methods used to identify or modify edge pixels or indicate properties of edges and edge pixels within an image. Edge detection methods are sometimes referred to simply as edge detectors. There are numerous applications of edge detectors in digital image processing for electronic printing. For example, identification of corner pixels has been used to sharpen corners within an image, see: U.S. Pat. No. 6,775,410, entitled "IMAGE PROCESSING METHOD FOR SHARPENING CORNERS OF TEXT AND LINE ART," to inventors R. Loce, X. Zhu, C. Cuciurean-Zapan. Identification of inner and outer border pixels has been used to control the apparent darkness of character strokes, see: U.S. Pat. No. 6,606,420, entitled "METHOD AND APPARATUS FOR DIGITAL IMAGE DARKNESS CONTROL IN SATURATED IMAGE STRUCTURES", to Loce et al; and U.S. Pat. No. 6,181,438, entitled "METHOD AND APPARATUS FOR DIGITAL IMAGE DARKNESS CONTROL USING QUANTIZED FRACTIONAL PIXELS," to Bracco et al. Also identification of anti-aliased pixels has been used for preferred rendering of those same pixels, see: U.S. Pat. No. 6,243,499, entitled "TAGGING OF ANTI-ALIASED IMAGES," to Loce, et al.; U.S. Pat. No. 6,144,461, entitled "METHOD FOR GENERATING RENDERING TAGS TO FACILITATE THE PRINTING OF ANTIALIASED IMAGES," to Crean et al.; and U.S. Pat. No. 6,167,166, entitled "METHOD TO ENABLE THE RECOGNITION AND RENDERING OF ANTIALIASED IMAGES," to Loce et al. All of the above cited are hereby incorporated by reference in their entirety for their teachings.

Edge detectors typically operate using a convolution mask and are based on differential operations. Differentials for edge/line detection are used to define color or brightness changes of pixels and their change directions. If there is an abrupt change of brightness within a short interval within an image, it means that within that interval there is high probability that an edge exists. One example of a convolution-based edge detector is the Roberts edge detector, which employs the square root of the magnitude squared of the convolution with the Robert's row and column edge detectors. The Prewitt edge detector employs the Prewitt compass gradient filters and returns the result for the largest filter response. The Sobel edge detector operates using convolutions with row and column edge gradient masks. The Marr-Hildreth edge detector performs two convolutions with a Laplacian of Gaussians and then detects zero crossings. The Kirsch edge detector performs convolution with eight masks that calculate gradient.

As indicated above, common edge detection methods employ a convolution-type computing architecture, usually with fixed coefficients. In the field of image processing, and in particular, for image processing in anticipation of electronic printing, the edge detection needs are numerous and varied.

Further, image processing for electronic printing often requires that any processing method operate "real-time," within a small number of fixed clock cycles, thereby excluding more complicated methods as too computationally intensive. What is needed is an anti-aliased pixel detection and rendering method with a computing architecture that is readily adapted to a wide variety of print and display settings. In particular, the anti-aliased pixel detection should be easily implementable in real-time and more adapted to the anti-aliased typography setting than are the common convolution-based methods of edge detection.

Disclosed in embodiments herein is an image processing method for rendering a digital image possessing anti-aliased pixels, comprising selecting a target pixel location within the digital image; observing a set of pixels within a pixel observation window superimposed on the digital image relative to the target pixel location; generating edge-state codes for a plurality of pairs of neighboring vectors of pixels within the pixel observation window; generating edge-identification codes from the plurality of edge-state codes using at least one look-up table; and, utilizing the edge-identification codes to select and apply to the digital image at the target pixel either anti-aliased rendering or conventional halftoning.

Further disclosed in embodiments herein is an image processing method for rendering anti-aliased pixels within a digital image, that comprises selecting a target pixel location within the digital image; observing a set of pixels within a pixel observation window superimposed on the digital image, relative to the target pixel location; generating edge-state codes for a plurality of pairs of neighboring vectors of pixels within the pixel observation window, wherein the plurality of vectors at of at least two different orientations; generating edge-identification codes from the plurality of edge-state codes using at least one look-up table; and, utilizing the edge-identification codes to select and apply anti-aliased rendering to the digital image at the target pixel.

Further disclosed in embodiments herein is a method for producing a rendered digital image using anti-aliased rendering and conventional halftoning, which comprises a) observing a set of pixels within a pixel observation window superimposed on the digital image relative to a target pixel location; b) generating edge-state codes for a plurality of pairs of neighboring vectors of pixels within the pixel observation window; c) generating edge-identification codes from the plurality of edge-state codes using at least one look-up table, wherein the edge-identification codes indicate proximity to a tinted edge; and, utilizing the edge-identification codes to select and apply to the digital image at the target pixel either anti-aliased rendering or conventional halftoning.

DETAILED DESCRIPTION

Figure 1:
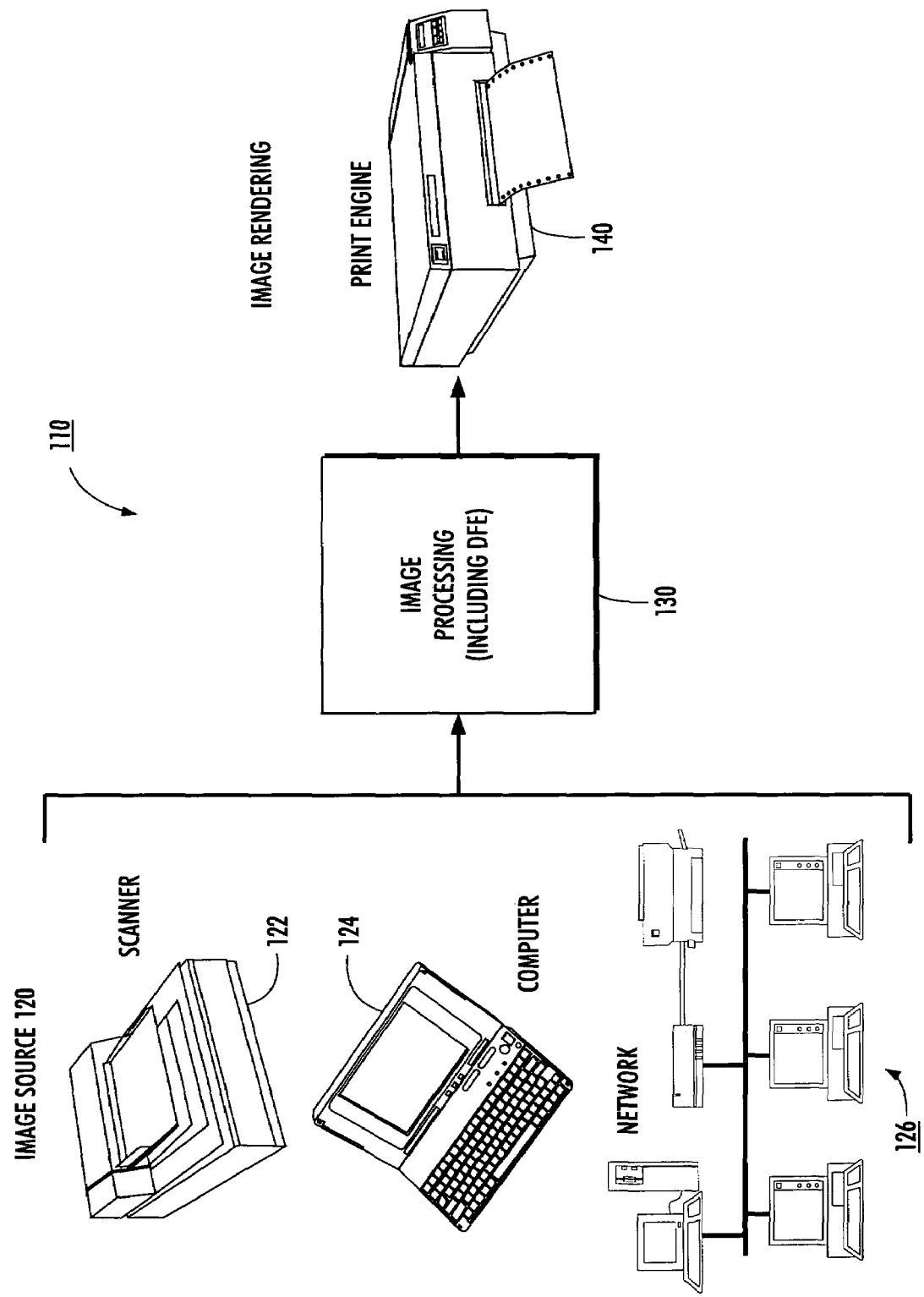
FIG. 1 is a general representation of a suitable system-level embodiment for one or more aspects of the teachings presented herein.

It is to be understood that the disclosure of the embodiments following describe a digital data technique which identifies anti-aliased pixels using a look-up table approach and renders those pixels with a pixel signal that yields a desirable appearance. For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

A "high addressability pixel" can be a pixel comprising a plurality of high addressability pixel events, where, for example, each of the high addressability pixel events corresponds to a specific spatial placement of the writing spot with respect to the pixel and has a value that represents a property of the writing spot at that specific spatial placement. In binary high addressability pixels, for example, each high addressability pixel event is a single bit indicating whether the writing spot is "on" or "off" at the corresponding spatial placement. In general, high addressability, as used above, refers to a pixel grid where the spatial sampling of the grid is higher in one dimension than in the other dimension.

High addressability also commonly refers to an imaging method where the imaging device can position the writing spot with precision finer than the size of the writing spot. For instance, a typical spot per inch (spi) high addressability system may operate with a 40 micron writing spot, an addressability of 600/inch in the direction perpendicular to the raster lines, and an addressability of 4800/inch in the direction of the raster lines.

High addressability also refers to writing an image with a higher sampling resolution than is input to the writing system. Similarly, high addressability also refers to a pixel sampling resolution that is higher than the input resolution in at least one dimension. For example, an input resolution of 300 spi may be converted to 600 spi and that resolution conversion is referred to as high addressability.

Systems that write high addressability images typically regulate a laser or similar writing device using clock modulation, amplitude modulation, pulse width modulation, pulse width position modulation or equivalent procedures. Imaging devices other than laser scanners can also employ high addressability. For instance, ink jet devices can have drop ejection rates that yield drop placements at high addressability and LED image bars can clock the LED "on" events at rates that are high relative to the spot size and diode spacing.

"Anti-aliasing" (AA) in the context of digitizing line art and certain graphical image structures is best known as a method of using intermediate levels of intensity to achieve subpixel position of edges for several reasons including reduction or elimination of jaggies on the edges of lines and polygons, including text. Jaggies are primarily visible at the edges of sloped lines approaching horizontal or vertical. The term anti-aliasing suggests an analog term aliasing; normally representing the presence of low frequencies resulting from sampling high frequency signals at too low a sampling rate. Anti-aliased images can be generated by capturing the image at a resolution greater than the final or desired output resolution, then reducing the resolution of the image by sub-sampling using an averaging process. Anti-aliasing can also be achieved through physical processes, such as scanning a document. A major benefit of anti-aliased images is that high contrast, saturated objects are surrounded with pixels possessing intermediate values that visually suggest the true, higher resolution position of object edges. In the context of the present disclosure, references to anti-aliased pixels will include pixels that are gray due to having undergone a computational or physical anti-aliasing process, as well as gray pixels that are at the edges of a gray image object.

There are several key types of anti-aliased pixels that are identified and beneficially rendered by embodiments taught herein. Gray pixels will be produced at the edges of at least some saturated strokes or image objects due to the averaging nature of anti-aliasing. We refer to this type of anti-aliased pixel as a "high-contrast-neighbor." Unconstrained anti-aliasing in the raster image processor (RIP) can yield two-pixel-wide gray lines where the original Page Description Language (PDL) stroke width was less than two and the color was saturated black. For instance, this effect occurs with a super-resolution rasterization method that snaps vertical and horizontal strokes and positions to the super-resolution pixel grid (e.g., 2400 spi), not the resolution out of the anti-aliasing operation (e.g., 600 spi). In the anti-aliasing process, a thin black line rasterized to 2400 spi may partly straddle two 600 spi rasters and thus be averaged down to gray values on both of those rasters. A similar effect can occur when scanning hardcopy documents, where a gray line is produced from a thin black line. Note that an analogous effect also occurs with a thin white line on a gray background. We refer to this type of anti-aliased pixel as "fine-feature." A third type of anti-aliased pixel is a gray pixel on the edge of a gray object on white background, a white object on gray background, or gray object on gray background. We refer to this type of anti-aliased pixel as "gray-object".

"Anti-aliased tagging" (AAT) refers to a method for detecting anti-aliased image regions and creating rendering tags within an architecture designed for the rendering of anti-aliased text or line regions, thereby enabling the anti-aliased pixels to be rendered in a manner distinguishable from that applied to continuous tone portions of an image.

"Anti-aliased rendering" (AAR) refers to rendering anti-aliased pixels to a form that achieves a preferred appearance upon printing or display. In electronic printing, AAR typical renders AA pixels with a very high frequency line screen that may be biased toward an edge, or may be used to form a sharp outline. AAR typically uses the identification information supplied by an AAT method.

Digital "halftoning" refers to encoding methods that are used to reduce the number of quantization levels per pixel in a digital image, while maintaining the gray appearance of the image at normal viewing distance. Halftoning is widely employed in the printing and display of digital images. The need for halftoning encoding arises either because the physical processes involved are binary in nature or the processes have been restricted to binary operation for reasons of cost, speed, memory or stability in the presence of process fluctuations. Examples of such processes are most printing presses, ink jet printers, binary cathode ray tube (CRT) displays, and laser xerography. In most printing and display applications, the halftoned image is composed ideally of two gray levels, black and white. Spatial integration, plus higher level processing performed by the human visual system, of local area coverage of black and white pixels, provides the appearance of a gray level, or "continuous tone", image. The primary categories of halftoning methods include, clustered dot screening, dispersed dot screening, stochastic screening, line screening, error diffusion. Many halftone techniques readily extend to color and to quantization using more than two levels.

The term "rendering" as used herein refers to converting digital image pixel values to states that can be used to drive an imaging device. For instance, halftoning and AAR are rendering operations that typically converts contone pixel values to binary or high addressable values that can be used to drive imaging devices such as laser scanners and ink jet print heads. There are several key types of anti-aliased pixels that are identified and beneficially rendered by embodiments taught herein. Due to the averaging nature of anti-aliasing, gray pixels will be produced at the edges of at least some saturated strokes or image objects. We refer to this type of anti-aliased pixel as a "high-contrast-neighbor".

Unconstrained anti-aliasing in the raster image processor (RIP) can yield two-pixel-wide gray lines where the original Page Description Language (PDL) or hardcopy stroke width was less than two and the color was saturated black. For instance, this effect occurs with a super-resolution rasterization method that snaps vertical and horizontal strokes and positions to the super-resolution pixel grid (e.g., 2400 spi), not the native pixel resolution (600 spi). In the anti-aliasing process, a thin black line rasterized to 2400 spi may partly straddle two 600 spi rasters and thus be averaged down to gray values on both of those rasters. A similar problem occurs with a thin white line on a gray background. We refer to this type of anti-aliased pixel as "fine-feature". A third type of anti-aliased pixel is a gray pixel on the edge of a gray object on white background, a white object on gray background, or gray object on gray background. We refer to this type of anti-aliased pixel as "gray-object".

Turning now to FIG. 1, depicted therein is an embodiment of a digital imaging system suitable for one or more aspects of the present invention. In the system 110, image source 120 is used to generate image data that is supplied to an image processing system 130, and which produces output data for rendering by print engine 140. Image source 120 may include scanner 122, computer 124, network 126 or any similar or equivalent image input terminal. On the output end printer engine 140 is preferably a xerographic engine however print engine 140 may include such equivalent print technology alternatives as wax, ink jet, etc. The teachings presented herein are directed toward aspects of image processor 130 depicted in FIG. 1. In particular, the intention of the teachings presented herein is to identify, and render accordingly, anti-aliased pixels within a digital image. It will be appreciated by those skilled in the art that the rendering of an image into a printable or displayable output format may be accomplished at any of a number of locations, which herein is provided for in but one example only as occurring within the image processing system 130 or within in the print engine 140.

Figure 2:
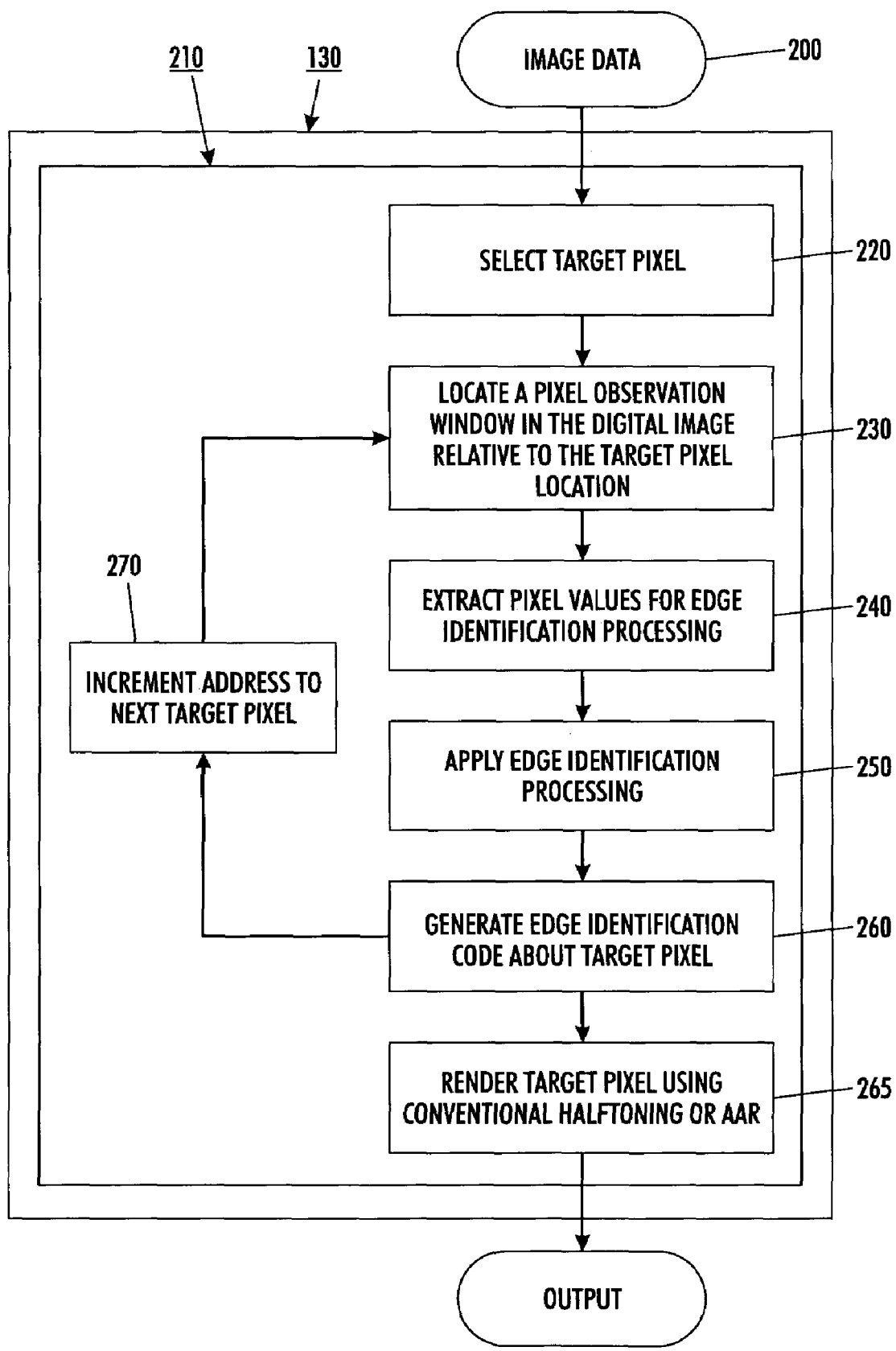
FIG. 2 depicts a flow chart of an image processing system containing an embodiment of the teachings presented herein.

Referring now to FIG. 2, shown therein is a diagram depicting the data flow in an example embodiment. Image processing system 130 receives raw (unprocessed) image input image data 200. Image processing system 130 includes an edge identification and rendering processor 210 for identifying anti-aliased pixels and rendering them accordingly, and may contain other image processing operations as well. Within the edge identification and rendering processor 210 a target pixel is selected 220 and an observation window of pixels is located about the target pixel 230. In one embodiment, this window is 5×5 pixels in dimension with the center pixel as the window origin, where the origin pixel is used to locate the window on the target pixel. However, a smaller widow such as a 3×3, or in the alternative a larger size window, or even a window of a non-square shape, is well within the contemplation of the present disclosure. This window is stepped through the image pixel data. In one embodiment the origin pixel is stepped to target pixels from top to bottom and from left to right through all address locations within an image. Typically, all pixels within the input image become target pixels in a successive manner. At each location the pixel values are extracted from within the window as indicated in step 240.

Figure 3:
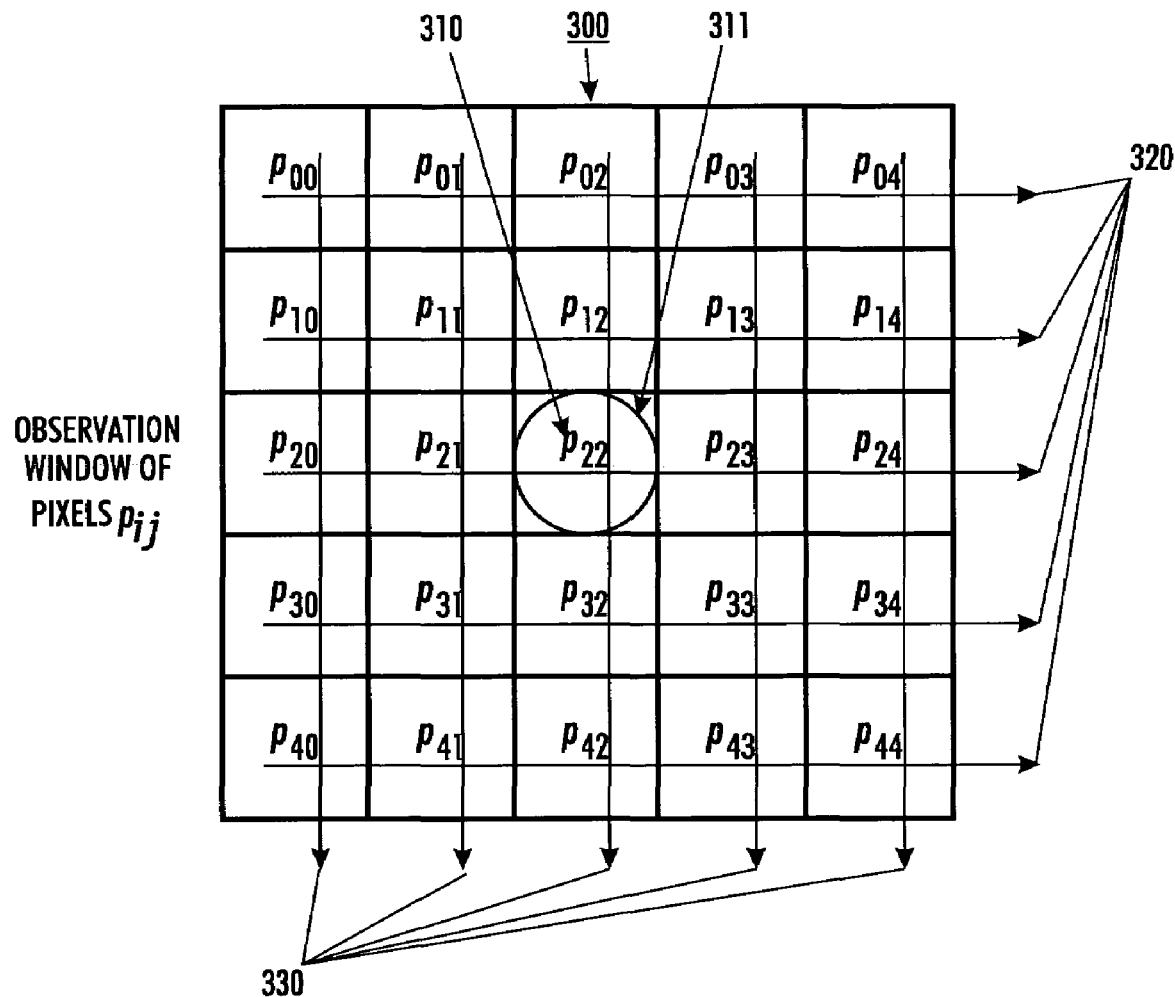
FIG. 3 schematically depicts an embodiment of an observation window.

FIG. 3 depicts a 5×5 window 300 with a center pixel 310 as the window origin ($p_{22}$), which is used in locating the window 300 about a given target pixel. The pixel values in the window are each denoted by some $p_{ij}$, where the subscripts i and j denote row and column indices respectively, and range from 0 to 4 for the 5×5 window. A circle 311 has been added as a quick visual indicator of the origin pixel location within the window. It is this origin pixel 310 which is typically stepped across all pixel address locations as each pixel location in turn becomes a target pixel. For each target pixel address, the pixel values within the window 300 are applied to the edge identification processing as described above and below in the discussion of FIG. 2. While the discussion here of FIGS. 2 and 3 describes the edge identification and rendering process as a serial operation, where successive target pixels are defined and processed, it will also be recognized by one skilled in the art that a parallel process could be employed where multiple target pixels could be processed simultaneously using multiple windows and multiple edge identification processors. The bitmap image data may be divided-up in any number of ways in order to achieve this parallel processing of the image data. One approach for example would be using segmentation to divide the image data into text and graphics. Another approach for color images would be to separate out the color planes and process each individually. There are many other approaches that will be apparent to those skilled in the art.

Returning now to FIG. 2, in step 250 the extracted pixel values are used as input into the edge identification and rendering processing means 210. There are alternative computing architectures that may be employed here, such as parallel, serial, or some combination of parallel and serial operations, as will be evident to those skilled in the art. However the computing architecture is configured, the operations are low complexity arithmetic and look-up table operations applied to the extracted pixel values. The edge identification performed in step 250 is encoded to an edge identification code in step 260. The edge identification and encoding steps are directed to identifying and tagging anti-aliased pixels, hence those steps may be considered a form of "Anti-Aliased Tagging" (AAT). The edge identification code may used in a step to rendering the target pixel 265, where the identification code enables selection of at least one of a special rendering method for anti-aliased pixels and a conventional halftoning method for non-anti-aliased. The special rendering method for anti-aliased pixel is a form of "Anti-Aliased Rendering" (AAR) and will be described more fully below. Finally, the increment block 270 restarts the process loop over at the next target pixel address until all target pixels have been processed.

When rendering an anti-aliased pixel, the rendered value or signal for that pixel is dependent on several factors. One factor is the type of pixel used in the rendering. High addressable, higher resolution (with respect to the input pixel), and PWM (Pulse Width Modulation) rendered pixels have a light portion and dark portion of the pixel. The size of the light portion, or equivalently the dark portion, depends on the contone value of the target pixel. In general, darker input anti-aliased pixels will be rendered to possess larger dark portions.

For high-contrast-neighbor type anti-aliased pixels, to achieve compactness of edges it is desirable to position the dark portion of a rendered anti-aliased pixel toward dark high contrast neighbors. Consider the x-direction (horizontal) 4× high addressable pixels shown in FIG. 10, where fill sequences are shown for filling a high addressable pixel from the right, left, center and spit across both sides. These rendering pixels can be used to bias the dark portion of the rendered pixel in the direction of dark neighbors as indicated by the edge identification code. While biasing to achieve compact edges is straightforward for x-direction high addressability and vertical edges, horizontal edges may use the center or split cells, which will result in a less compact edge. Analogous considerations apply for y-direction (vertical) high addressability. As will be appreciated by one skilled in the art, this type of darkness biasing can be performed for high resolution output, where the biasing options are increased to include corners.

An additional consideration when rendering high-contrast-neighbor anti-aliased pixels is that a goal is to accurately position an edge as was intended in the image prior to anti-aliasing. To achieve this positioning a calibration may need to be performed to determine the amount of darkness, or fill, to utilize in the rendered pixel for a given input contone value.

The goals are similar for rendering fine feature anti-aliased pixels. It is desirable to produce compact edges in the rendered image and position edges as intended prior to anti-aliasing. Similar biasing concepts apply, as was described for high-contrast-neighbor anti-aliased pixels. One of the differences is that there may not be a saturated neighboring pixel toward which to bias the dark portion of the rendered pixel, and biasing may need to be toward a neighboring gray pixel.

Another difference is that a different calibration for the amount of fill may be needed for rendering fine-feature anti-aliased pixels versus high-contrast-neighbor anti-aliased pixels. The reason for this potential difference is that the darkness marking response of a print engine can depend on the size of the image object being printed.

Rendering gray-object anti-aliased pixels involves a goal other than accurate edge placement. In this rendering scenario the goal is to accentuate or sharpen the edge of a halftoned object. Biasing the dark portion of the high addressable pixel is not an important consideration and the amount of fill used for the rendered pixel can be decided based on aesthetics.

Figure 4:
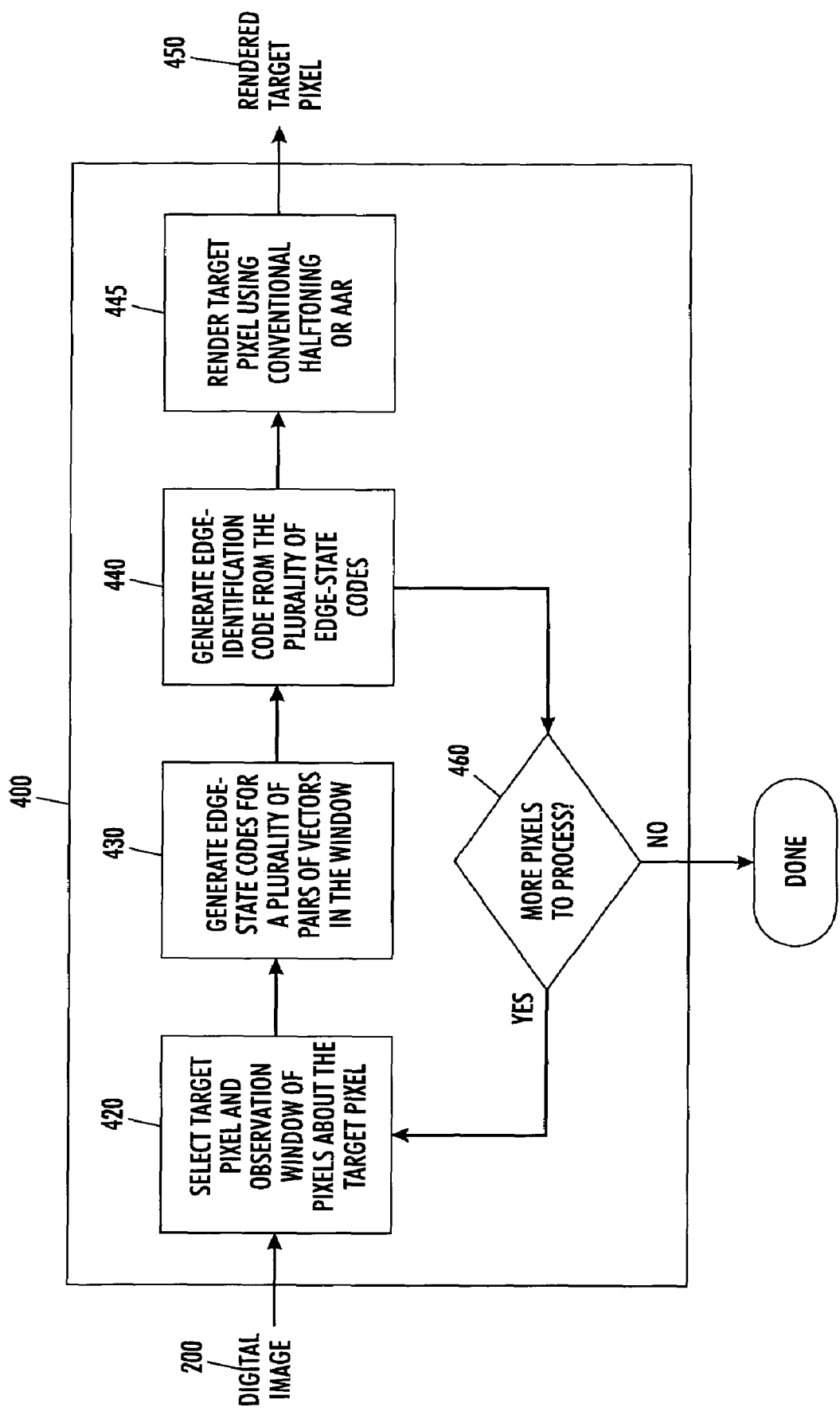
FIG. 4 is a generalized data flow representation of one embodiment of the teachings presented herein.

FIG. 4 depicts a flowchart wherein a digital image data 200 is input to edge-identification and rendering process 400. A target pixel is selected and an observation window of pixels is observed about the target pixel 420. Edge-state codes are generated for a plurality of pairs of vectors of pixels that run through the observation window 430. FIG. 3 depicts one arrangement of vectors of pixels that run through the observation window in horizontal 320 and vertical 330 orientations. Vectors of other orientation, such as diagonal, may be employed in generating edge-state codes. An edge-identification code is generated from the plurality of edge state codes 440 to produce an edge-identification code about the target pixel 450. The edge-identification code is used in a rendering processes 445 to direct the rendering performed at the target pixel. If the edge-identification code indicates that the target pixel is an anti-aliased pixel, AAR will be applied in a manner that is consistent with the type of anti-aliased pixel and local edge state. If the edge-identification code indicates that the target pixel is not an anti-aliased pixel, a conventional halftoning process will be applied, where the conventional process is that process which is applied within the body of the contone image object. If more pixels are to be processed, the edge identification and rendering process returns to step 420.

Figure 5:
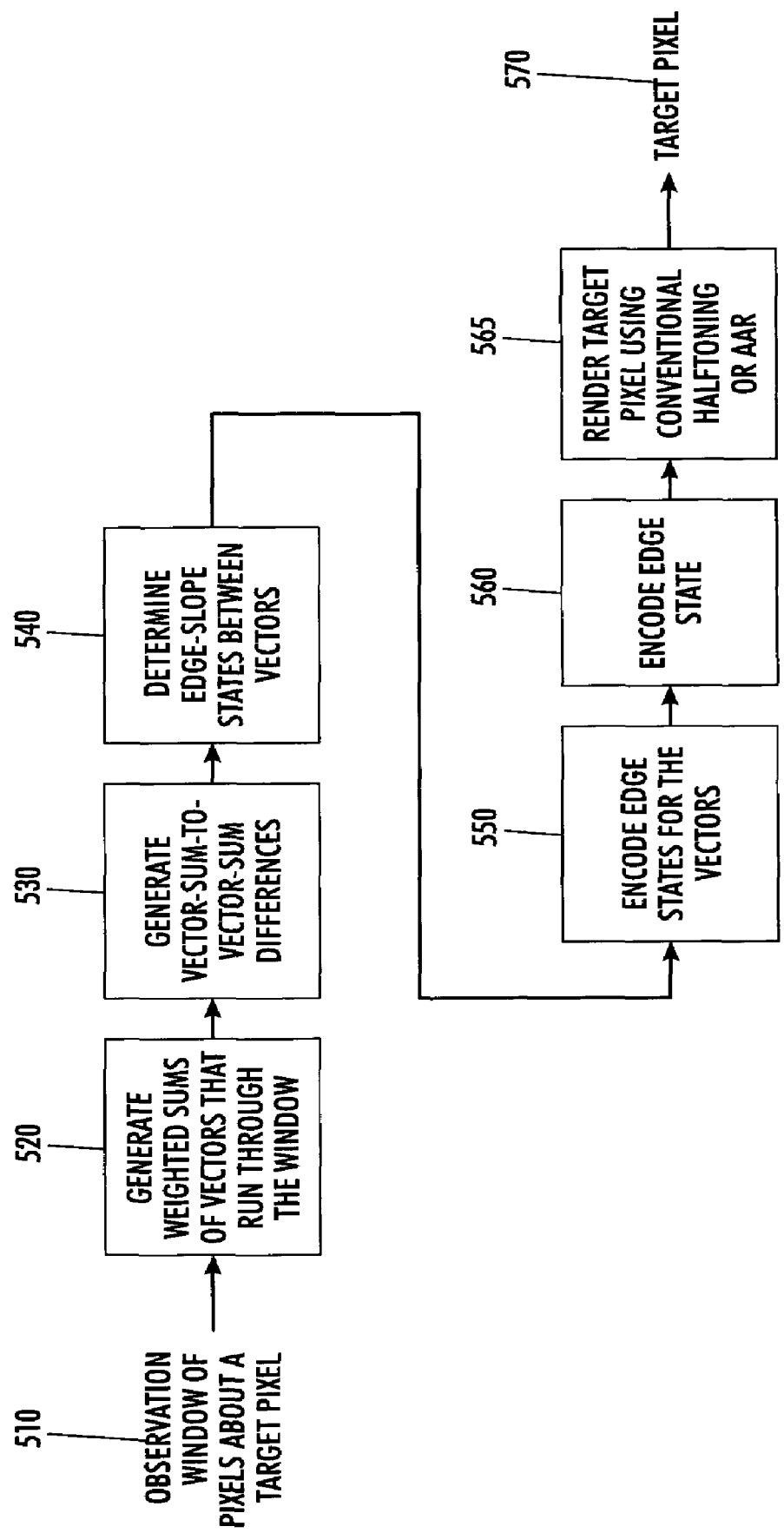
FIG. 5 is a generalized data flow representation of another embodiment of the teachings presented herein.

FIG. 5 depicts how an observation window of pixels 300 about a target pixel 310 is input 510 to step 520 where a plurality of sums of weighted pixel values are generated, where each sum is taken over a vector of pixels that run through the observation window. The weights can be applied as multiplicative coefficients, or another means, such as by an additive or subtractive operation. Step 530 receives the weighted sums of vectors of pixels, and generates vector-sum-to-vector-sum differences between pairs of neighboring vectors. For instance, when employing horizontal vectors 320 for pixel observation window rows 0 through 4, differences can be generated for the respective sums of row 0 and 1, the respective sums of rows 1 and 2, the respective sums of rows 2 and 3, and the respective sums of rows 3 and 4. Alternatively, differences may be taken between neighboring vectors other than the nearest neighboring vectors. For instance, differences can be generated for the respective sums of row 0 and 2, the respective sums of rows 1 and 3, and the respective sums of rows 2 and 4.

The vector-sum-to-vector-sum differences are input to step 540 where an "edge-slope state" between each of the plurality of vector pairs is determined. "Edge-slope state" refers to the presence of an edge and the orientation of the edge (rising or falling) between the vectors of pixels. Large differences between the sums indicate the presence of an edge, while positive and negative signs to the difference indicate a rising or falling edge, respectively. Step 550 receives the plurality of edge-slope states and encodes those states as a plurality of respective bit patterns. For instance, the presence or strength of an edge between two vectors of pixels may be encoded in some number of bits, and the sign, or orientation, of the edge may be encoded by another bit. For applications that do not require high precision definition of edges, it may be sufficient to encode the presence and strength of an edge in 1 bit, i.e., an edge is significantly present or an edge is not significantly present. For other applications requiring finer identification of edges, more than one bit may be used to define the presence and strength of an edge.

The plurality of edge states for the vectors generated in step 550 are input to an encoding process 560 that generates a code for the edge state of the plurality of vectors of the window. In other words, step 560 will receive a plurality of bit patterns, i.e., edge-state codes for the vector differences, and may employ a look-up table to map those bit patterns, to a bit pattern 570 representing a general state of the edges for the plurality of vectors examined. For instance, an edge-state code about a target pixel may indicate rising and falling edges for multiple locations within the pixel observation window. The edge-state code is used in a rendering processes 565 to direct the rendering performed at the target pixel. If the edge-state code indicates that the target pixel is an anti-aliased pixel, AAR will be applied in a manner that is consistent with the type of anti-aliased pixel and local edge state. If the edge-state code indicates that the target pixel is not an anti-aliased pixel, a conventional halftoning process will be applied, where the conventional process is that process which is applied within the body of the contone image object.

Figure 6:
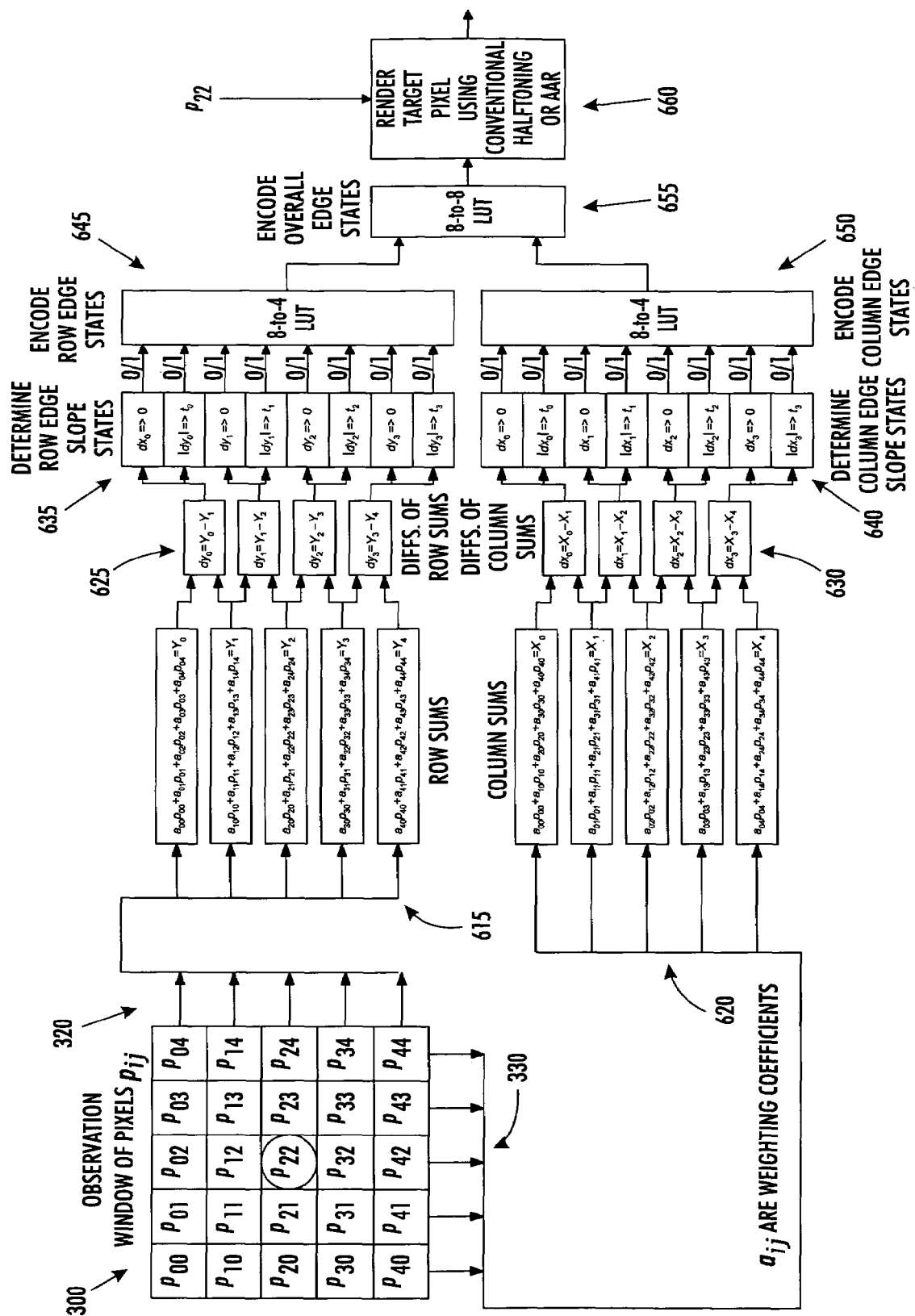
FIG. 6 is a schematic of an embodiment of the computing architecture of an embodiment of the teachings presented herein.

FIG. 6 depicts a detailed high-level block diagram schematic for one embodiment consistent with the teachings provided herein. An observation window of pixels 300 is shown with the window origin pixel denoted $p_{22}$. Pixels aligned in a particular orientation are used to form a plurality of vectors of pixels associated with that orientation. In FIG. 6, rows of pixels in the observation window are used to form respective horizontal vectors of pixels 320 and columns of pixels are used to form respective vertical vectors of pixels 330. As will be evident to those skilled in the art, other or additional vectors of pixels of other orientations may be formed from pixels in the observation window. For example, vectors of pixels may be formed from pixels aligned at some angle, such as ±45°.

In a next step, the plurality of vectors of pixels are received and weighted sums of pixels within each vector are generated. FIG. 6 illustrates multiplicative weighting with weights $a_{ij}$ applied to the pixel values within a vector, whereupon the weighted values are summed. These weights $a_{ij}$ can be selected and optimized for particular applications. For instance, in the presence of background noise in the image, the weights may be made uniform (e.g., all 1's) in an attempt to suppress the effect of noise on the edge identification. Conversely, a low noise setting or in situations where images possess very small edge features it may be required to utilize larger values of weights $a_{ij}$ near the center of the window and smaller values at greater distance from the center. The values could decrease from a center value with a trend such as linear or Gaussian. The weighting and summing process is performed for each respective vector of each orientation. Summing blocks 615 in the present embodiment perform the summing process for the horizontal vectors and Summing blocks 620 perform the summing process for the vertical vectors. A plurality of sums are produced, denote by $Y_i$ for the horizontal vectors and $X_i$ for the vertical vectors, where i=0 to 4 in the presently illustrated embodiment.

In some computing architectures it can be advantageous to reduce the number of bits in the weighting and summing process. For instance, when using 8-bit numbers possessing range 0 to 255, and using multiplicative coefficients defined by 8 bits, the resultant product may require 16-bit representation. A sum over the vector of pixels would require an even higher bit representation. Using such a large number of bits to represent results of these intermediate operations can be very costly for real-time, high-speed applications. Further, typical edge identification tasks do not require such a great bit depth. It has been found that it is advantageous as to both cost and speed to reduce the bit depth of these operations. For instance, the weighted sums can be limited to 8 bits of quantization resolution.

In a subsequent step, the weighted vector sums are received and differences are formed between pairs of sums of neighboring vectors of a particular orientation. In FIG. 6, computational blocks 625 and 630 perform differencing for nearest-neighbor rows and nearest-neighbor columns, respectively, to form a plurality of vector-sum differences for each orientation. In FIG. 6, the differences are denoted as $dy_c$ for column vectors and $dy_i$ for row vectors, where i=0 to 3. As stated above, the difference step may not be restricted to nearest neighbors, and may be performed between neighboring vectors that are separated by one or more vectors.

In a further step, a plurality of edge-slope states between the vectors are generated using respective differences between vector sums as input. Determination of the edge-slope states depicted in FIG. 6 as performed by computational blocks 635 and 640 tests the magnitude and sign of each difference. For each difference, the significance of the edge is determined by comparing the magnitude of that difference to a threshold. A 1-bit output (states 0 or 1) indicates that the difference is at or above a threshold, thereby indicating significance, or is not at or above the threshold, thereby indicating lack of significance. The thresholds are depicted in FIG. 6 as $t_i$ where i=0 to 3. These thresholds may be set over a broad range of value and made the same or different for different vector pairs or different vector orientations depending on the particular anti-aliasing operation that was applied to the input image. For instance, consider an anti-aliasing operation that generates a super resolution image at, say 2400 spi, and averages 4×4 blocks of pixels and resamples to 600 spi. Many pixel at the edge of saturated image objects will possess values of 64, 128, or 192. To identify those pixels a threshold should be set to a value slightly below 64. Similarly, for super resolution anti-aliasing starting at 1200 spi, identification of anti-aliased pixels requires a threshold somewhat below 128.

Other information on local or global image characteristics may be used to set thresholds to determine edge identification codes that can be used to direct rendering. Consider the need to render the edges of scanned images. The edge pixel values obtained by the physical scanning process can be more varied than values derived by a super resolution anti-aliasing process. When a scanned image may be processed, to guide the selection of thresholds, additional information such as image contrast, background gray level, foreground gray level, noise level, may be used to select threshold that are above the background and noise level of the image. An image tag indicating that an image has been or has not been scanned can be used in selecting the method to select thresholds, i.e., use a method based on super resolution AA or on scanning background and noise levels.

Also, consider the need to recognize edge pixels of gray image objects. An edge pixel may be determined to be associated with a gray image object by use of one or more methods. For instance, the pixel may have been tagged as such in the DFE during rasterization. Or, an examination of pixel values within an observation window about the target pixel can be used to estimate if the pixel is associated with a gray image object. Through experimentation, it has been found that a count of less than 3 pixels within a 5×5 window possessing the saturation value (e.g., 255) can be used as an indicator that the target pixel is associated or not associated with a gray image object. When it is determined that a pixel is at the edge of a gray object the thresholds may be set based on the desired rendering effect. One possibility is to apply special rendering (AAR) to edges of gray image objects that are darker than some value, say 32. In that case the threshold can be set just below 32. Or, the thresholds can be set based on the statistics of pixel values in the window. For instance, two populations of gray levels within a window can be an indication of a gray image object on a white or gray background. The thresholds can be set to a value between the two populations of gray levels to enable identification of the edge pixels.

The sign of each difference is also tested and the result is rendered to a 1-bit form indicating a positive or negative slope, where slope of zero could be classified either positive or negative due to the lack of significance of the edge. The edge-slope states are determined for row and column vectors, by computational blocks 635 and 640, respectively. A plurality of edge-slope states are determined for each orientation.

An edge encoding block for a given particular orientation receives the edge-slope state and generates a code for the edge state of that orientation. In FIG. 6, encoding blocks 645 and 650 provide the encoding of edge states for horizontal and vertical orientations, respectively. The encoding may in one embodiment be performed via a Look-Up Table (LUT) that maps the bits of the plurality of edge-slope states for an orientation to an orientation edge-state code. The FIG. 6 embodiment illustrates the use of an 8-bit-to-4-bit LUT for that encoding purpose, but it is within the scope of the invention to allow other bit mapping relationship. For instance, use of more vectors or high quantization of vector-sum differences could require more than 8 bits as input and 4 bits output. If only one orientation is employed, this orientation edge-state code is the resulting edge state code of the process. However, if more than one orientation of vectors is employed, the multiple orientation edge-state codes are mapped through an additional encoding process block 655 to arrive at output edge-state code. This encoding may also be performed using a LUT process.

The edge-state code is used in a rendering processes 660 to direct the rendering performed at the target pixel. If the edge-state code indicates that the target pixel is an anti-aliased pixel, AAR will be applied in a manner that is consistent with the type of anti-aliased pixel and local edge state. If the edge-state code indicates that the target pixel is not an anti-aliased pixel, a conventional halftoning process will be applied, where the conventional process is that process which is applied within the body of the contone image object.

An example of a LUT for encoding edge states is given in Table 1. The codes are shown in the table as hexadecimal numbers. In Table 1, the notation used is in reference to horizontal vectors, but concepts embodied by the table are more general. For instance, it is straightforward to interpret the inputs to be from an orientation other than horizontal, such as vertical. Further, the table can be considered an example of a means to produce an orientation edge-state code, or an output edge-state code if only one orientation is to be employed. The notation used as edge state descriptions in Table 1 is explained in Table 2.

TABLE 1

Row Edge Encoding

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code Output Value |
|---|---|---|---|---|---|---|---|---|---|
| 0 | 0 | 0 | 0 | 0 | 0 | 0 | 0 | Flat | 0x0E |
| 0 | 0 | 0 | 0 | 0 | 0 | 0 | 1 | ↑FB | 0x0F |
| 0 | 0 | 0 | 0 | 0 | 0 | 1 | 0 | Flat | 0x0E |
| 0 | 0 | 0 | 0 | 0 | 0 | 1 | 1 | ↓FB | 0x0F |
| 0 | 0 | 0 | 0 | 0 | 1 | 0 | 0 | ↑B | 0x0F |
| 0 | 0 | 0 | 0 | 0 | 1 | 0 | 1 | ↑B↑FB | 0x02 |
| 0 | 0 | 0 | 0 | 0 | 1 | 1 | 0 | ↑B | 0x0F |
| 0 | 0 | 0 | 0 | 0 | 1 | 1 | 1 | ↑B↓FB | 0x0F |
| 0 | 0 | 0 | 0 | 1 | 0 | 0 | 0 | Flat | 0x0E |
| 0 | 0 | 0 | 0 | 1 | 0 | 0 | 1 | ↑FB | 0x0F |
| 0 | 0 | 0 | 0 | 1 | 0 | 1 | 0 | Flat | 0x0E |
| 0 | 0 | 0 | 0 | 1 | 0 | 1 | 1 | ↓FB | 0x0F |
| 0 | 0 | 0 | 0 | 1 | 1 | 0 | 0 | ↓B | 0x0F |
| 0 | 0 | 0 | 0 | 1 | 1 | 0 | 1 | ↓B↑FB | 0x0F |
| 0 | 0 | 0 | 0 | 1 | 1 | 1 | 0 | ↓B | 0x0F |
| 0 | 0 | 0 | 0 | 1 | 1 | 1 | 1 | ↓B↓FB | 0x03 |
| 0 | 0 | 0 | 1 | 0 | 0 | 0 | 0 | ↑T | 0x0F |
| 0 | 0 | 0 | 1 | 0 | 0 | 0 | 1 | ↑T↑FB | 0x0F |
| 0 | 0 | 0 | 1 | 0 | 0 | 1 | 0 | ↑T | 0x0F |
| 0 | 0 | 0 | 1 | 0 | 0 | 1 | 1 | ↑T↓FB | 0x00 |
| 0 | 0 | 0 | 1 | 0 | 1 | 0 | 0 | ↑T↑B | 0x06 |
| 0 | 0 | 0 | 1 | 0 | 1 | 0 | 1 | ↑T↑B↑FB | 0x0F |
| 0 | 0 | 0 | 1 | 0 | 1 | 1 | 0 | ↑T↑B | 0x06 |
| 0 | 0 | 0 | 1 | 0 | 1 | 1 | 1 | ↑T↑B↓FB | 0x0F |
| 0 | 0 | 0 | 1 | 1 | 0 | 0 | 0 | ↑T | 0x0F |
| 0 | 0 | 0 | 1 | 1 | 0 | 0 | 1 | ↑T↑FB | 0x0F |
| 0 | 0 | 0 | 1 | 1 | 0 | 1 | 0 | ↑T | 0x0F |
| 0 | 0 | 0 | 1 | 1 | 0 | 1 | 1 | ↑T↓FB | 0x00 |
| 0 | 0 | 0 | 1 | 1 | 1 | 0 | 0 | ↑T↓B | 0x04 |
| 0 | 0 | 0 | 1 | 1 | 1 | 0 | 1 | ↑T↓B↑FB | 0x0F |
| 0 | 0 | 0 | 1 | 1 | 1 | 1 | 0 | ↑T↓B | 0x04 |

TABLE 1-continued

Row Edge Encoding

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code Output Value |
|---|---|---|---|---|---|---|---|---|---|
| 0 | 0 | 0 | 1 | 1 | 1 | 1 | 1 | ↑T↓B↓FB | 0x0F |
| 0 | 0 | 1 | 0 | 0 | 0 | 0 | 0 | Flat | 0x0E |
| 0 | 0 | 1 | 0 | 0 | 0 | 0 | 1 | ↑FB | 0x0F |
| 0 | 0 | 1 | 0 | 0 | 0 | 1 | 0 | Flat | 0x0E |
| 0 | 0 | 1 | 0 | 0 | 0 | 1 | 1 | ↓FB | 0x0F |
| 0 | 0 | 1 | 0 | 0 | 1 | 0 | 0 | ↑B | 0x0F |
| 0 | 0 | 1 | 0 | 0 | 1 | 0 | 1 | ↑B↑FB | 0x02 |
| 0 | 0 | 1 | 0 | 0 | 1 | 1 | 0 | ↑B | 0x0F |
| 0 | 0 | 1 | 0 | 0 | 1 | 1 | 1 | ↑B↓FB | 0x0F |
| 0 | 0 | 1 | 0 | 1 | 0 | 0 | 0 | Flat | 0x0E |
| 0 | 0 | 1 | 0 | 1 | 0 | 0 | 1 | ↑FB | 0x0F |
| 0 | 0 | 1 | 0 | 1 | 0 | 1 | 0 | Flat | 0x0E |
| 0 | 0 | 1 | 0 | 1 | 0 | 1 | 1 | ↓FB | 0x0F |
| 0 | 0 | 1 | 0 | 1 | 1 | 0 | 0 | ↓B | 0x0F |
| 0 | 0 | 1 | 0 | 1 | 1 | 0 | 1 | ↓B↑FB | 0x0F |
| 0 | 0 | 1 | 0 | 1 | 1 | 1 | 0 | ↓B | 0x0F |
| 0 | 0 | 1 | 0 | 1 | 1 | 1 | 1 | ↓B↓FB | 0x03 |
| 0 | 0 | 1 | 1 | 0 | 0 | 0 | 0 | ↓T | 0x0F |
| 0 | 0 | 1 | 1 | 0 | 0 | 0 | 1 | ↓T↑FB | 0x01 |
| 0 | 0 | 1 | 1 | 0 | 0 | 1 | 0 | ↓T | 0x0F |
| 0 | 0 | 1 | 1 | 0 | 0 | 1 | 1 | ↓T↓FB | 0x0F |
| 0 | 0 | 1 | 1 | 0 | 1 | 0 | 0 | ↓T↑B | 0x05 |
| 0 | 0 | 1 | 1 | 0 | 1 | 0 | 1 | ↓T↑B↑FB | 0x0F |
| 0 | 0 | 1 | 1 | 0 | 1 | 1 | 0 | ↓T↑B | 0x05 |
| 0 | 0 | 1 | 1 | 0 | 1 | 1 | 1 | ↓T↑B↓FB | 0x0F |
| 0 | 0 | 1 | 1 | 1 | 0 | 0 | 0 | ↓T | 0x0F |
| 0 | 0 | 1 | 1 | 1 | 0 | 0 | 1 | ↓T↑FB | 0x01 |
| 0 | 0 | 1 | 1 | 1 | 0 | 1 | 0 | ↓T | 0x0F |
| 0 | 0 | 1 | 1 | 1 | 0 | 1 | 1 | ↓T↓FB | 15 + K17 |
| 0 | 0 | 1 | 1 | 1 | 1 | 0 | 0 | ↓T↓B | 0x07 |
| 0 | 0 | 1 | 1 | 1 | 1 | 0 | 1 | ↓T↓B↑FB | 0x0F |
| 0 | 0 | 1 | 1 | 1 | 1 | 1 | 0 | ↓T↓B | 0x07 |
| 0 | 0 | 1 | 1 | 1 | 1 | 1 | 1 | ↓T↓B↓FB | 0x0F |
| 0 | 1 | 0 | 0 | 0 | 0 | 0 | 0 | ↑FT | 0x0F |
| 0 | 1 | 0 | 0 | 0 | 0 | 0 | 1 | ↑FT↑FB | 0x0F |
| 0 | 1 | 0 | 0 | 0 | 0 | 1 | 0 | ↑FT | 0x0F |
| 0 | 1 | 0 | 0 | 0 | 0 | 1 | 1 | ↑FT↓FB | 0x0F |
| 0 | 1 | 0 | 0 | 0 | 1 | 0 | 0 | ↑FT↑B | 0x0F |
| 0 | 1 | 0 | 0 | 0 | 1 | 0 | 1 | ↑FT↑B↑FB | 0x0F |
| 0 | 1 | 0 | 0 | 0 | 1 | 1 | 0 | ↑FT↑B | 0x0F |
| 0 | 1 | 0 | 0 | 0 | 1 | 1 | 1 | ↑FT↑B↓FB | 0x0F |
| 0 | 1 | 0 | 0 | 1 | 0 | 0 | 0 | ↑FT | 0x0F |
| 0 | 1 | 0 | 0 | 1 | 0 | 0 | 1 | ↑FT↑FB | 0x0F |
| 0 | 1 | 0 | 0 | 1 | 0 | 1 | 0 | ↑FT | 0x0F |
| 0 | 1 | 0 | 0 | 1 | 0 | 1 | 1 | ↑FT↓FB | 0x0F |
| 0 | 1 | 0 | 0 | 1 | 1 | 0 | 0 | ↑FT↓B | 0x0C |
| 0 | 1 | 0 | 0 | 1 | 1 | 0 | 1 | ↑FT↓B↑FB | 0x0F |
| 0 | 1 | 0 | 0 | 1 | 1 | 1 | 0 | ↑FT↓B | 0x0C |
| 0 | 1 | 0 | 0 | 1 | 1 | 1 | 1 | ↑FT↓B↓FB | 0x0F |
| 0 | 1 | 0 | 1 | 0 | 0 | 0 | 0 | ↑FT↑T | 0x0A |
| 0 | 1 | 0 | 1 | 0 | 0 | 0 | 1 | ↑FT↑T↑FB | 0x0F |
| 0 | 1 | 0 | 1 | 0 | 0 | 1 | 0 | ↑FT↑T | 0x0A |
| 0 | 1 | 0 | 1 | 0 | 0 | 1 | 1 | ↑FT↑T↓FB | 0x0F |
| 0 | 1 | 0 | 1 | 0 | 1 | 0 | 0 | ↑FT↑T↑B | 0x0F |
| 0 | 1 | 0 | 1 | 0 | 1 | 0 | 1 | ↑FT↑T↑B↑FB | 0x0F |
| 0 | 1 | 0 | 1 | 0 | 1 | 1 | 0 | ↑FT↑T↑B | 0x0F |
| 0 | 1 | 0 | 1 | 0 | 1 | 1 | 1 | ↑FT↑T↑B↓FB | 0x0F |
| 0 | 1 | 0 | 1 | 1 | 0 | 0 | 0 | ↑FT↑T | 0x0A |
| 0 | 1 | 0 | 1 | 1 | 0 | 0 | 1 | ↑FT↑T↑FB | 0x0F |
| 0 | 1 | 0 | 1 | 1 | 0 | 1 | 0 | ↑FT↑T | 0x0A |
| 0 | 1 | 0 | 1 | 1 | 0 | 1 | 1 | ↑FT↑T↓FB | 0x0F |
| 0 | 1 | 0 | 1 | 1 | 1 | 0 | 0 | ↑FT↑T↓B | 0x0F |
| 0 | 1 | 0 | 1 | 1 | 1 | 0 | 1 | ↑FT↑T↓B↑FT | 0x0F |
| 0 | 1 | 0 | 1 | 1 | 1 | 1 | 0 | ↑FT↑T↓B | 0x0F |
| 0 | 1 | 0 | 1 | 1 | 1 | 1 | 1 | ↑FT↑T↓B↓FT | 0x0F |
| 0 | 1 | 1 | 0 | 0 | 0 | 0 | 0 | ↑FT | 0x0F |
| 0 | 1 | 1 | 0 | 0 | 0 | 0 | 1 | ↑FT↑FB | 0x0F |
| 0 | 1 | 1 | 0 | 0 | 0 | 1 | 0 | ↑FT | 0x0F |
| 0 | 1 | 1 | 0 | 0 | 0 | 1 | 1 | ↑FT↓FB | 0x0F |
| 0 | 1 | 1 | 0 | 0 | 1 | 0 | 0 | ↑FT↑B | 0x0F |

TABLE 1-continued

Row Edge Encoding

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code Output Value |
|---|---|---|---|---|---|---|---|---|---|
| 0 | 1 | 1 | 0 | 0 | 1 | 0 | 1 | ↑FT↑B↑FB | 0x0F |
| 0 | 1 | 1 | 0 | 0 | 1 | 1 | 0 | ↑FT↑B | 0x0F |
| 0 | 1 | 1 | 0 | 0 | 1 | 1 | 1 | ↑FT↑B↓FB | 0x0F |
| 0 | 1 | 1 | 0 | 1 | 0 | 0 | 0 | ↑FT | 0x0F |
| 0 | 1 | 1 | 0 | 1 | 0 | 0 | 1 | ↑FT↑FB | 0x0F |
| 0 | 1 | 1 | 0 | 1 | 0 | 1 | 0 | ↑FT | 0x0F |
| 0 | 1 | 1 | 0 | 1 | 0 | 1 | 1 | ↑FT↓FB | 0x0F |
| 0 | 1 | 1 | 0 | 1 | 1 | 0 | 0 | ↑FT↓B | 0x0C |
| 0 | 1 | 1 | 0 | 1 | 1 | 0 | 1 | ↑FT↓B↑FB | 0x0F |
| 0 | 1 | 1 | 0 | 1 | 1 | 1 | 0 | ↑FT↓B | 0x0C |
| 0 | 1 | 1 | 0 | 1 | 1 | 1 | 1 | ↑FT↓B↓FB | 0x0F |
| 0 | 1 | 1 | 1 | 0 | 0 | 0 | 0 | ↑FT↓T | 0x0F |
| 0 | 1 | 1 | 1 | 0 | 0 | 0 | 1 | ↑FT↓T↑FB | 0x0F |
| 0 | 1 | 1 | 1 | 0 | 0 | 1 | 0 | ↑FT↓T | 0x0F |
| 0 | 1 | 1 | 1 | 0 | 0 | 1 | 1 | ↑FT↓T↓FB | 0x0F |
| 0 | 1 | 1 | 1 | 0 | 1 | 0 | 0 | ↑FT↓T↑B | 0x0F |
| 0 | 1 | 1 | 1 | 0 | 1 | 0 | 1 | ↑FT↓T↑B↑FB | 0x0F |
| 0 | 1 | 1 | 1 | 0 | 1 | 1 | 0 | ↑FT↓T↑B | 0x0F |
| 0 | 1 | 1 | 1 | 0 | 1 | 1 | 1 | ↑FT↓T↑B↓FB | 0x0F |
| 0 | 1 | 1 | 1 | 1 | 0 | 0 | 0 | ↑FT↓T | 0x0F |
| 0 | 1 | 1 | 1 | 1 | 0 | 0 | 1 | ↑FT↓T↑FB | 0x0F |
| 0 | 1 | 1 | 1 | 1 | 0 | 1 | 0 | ↑FT↓T | 0x0F |
| 0 | 1 | 1 | 1 | 1 | 0 | 1 | 1 | ↑FT↓T↓FB | 0x0F |
| 0 | 1 | 1 | 1 | 1 | 1 | 0 | 0 | ↑FT↓T↓B | 0x0F |
| 0 | 1 | 1 | 1 | 1 | 1 | 0 | 1 | ↑FT↓T↓B↑FB | 0x0F |
| 0 | 1 | 1 | 1 | 1 | 1 | 1 | 0 | ↑FT↓T↓B | 0x0F |
| 0 | 1 | 1 | 1 | 1 | 1 | 1 | 1 | ↑FT↓T↓B↓FB | 0x0F |
| 1 | 0 | 0 | 0 | 0 | 0 | 0 | 0 | Flat | 0x0E |
| 1 | 0 | 0 | 0 | 0 | 0 | 0 | 1 | ↑FB | 0x0F |
| 1 | 0 | 0 | 0 | 0 | 0 | 1 | 0 | Flat | 0x0E |
| 1 | 0 | 0 | 0 | 0 | 0 | 1 | 1 | ↓FB | 0x0F |
| 1 | 0 | 0 | 0 | 0 | 1 | 0 | 0 | ↑B | 0x0F |
| 1 | 0 | 0 | 0 | 0 | 1 | 0 | 1 | ↑B↑FB | 0x02 |
| 1 | 0 | 0 | 0 | 0 | 1 | 1 | 0 | ↑B | 0x0F |
| 1 | 0 | 0 | 0 | 0 | 1 | 1 | 1 | ↑B↓FB | 0x0F |
| 1 | 0 | 0 | 0 | 1 | 0 | 0 | 0 | Flat | 0x0E |
| 1 | 0 | 0 | 0 | 1 | 0 | 0 | 1 | ↑FB | 0x0F |
| 1 | 0 | 0 | 0 | 1 | 0 | 1 | 0 | Flat | 0x0E |
| 1 | 0 | 0 | 0 | 1 | 0 | 1 | 1 | ↓FB | 0x0F |
| 1 | 0 | 0 | 0 | 1 | 1 | 0 | 0 | ↓B | 0x0F |
| 1 | 0 | 0 | 0 | 1 | 1 | 0 | 1 | ↓B↑FB | 0x0F |
| 1 | 0 | 0 | 0 | 1 | 1 | 1 | 0 | ↓B | 0x0F |
| 1 | 0 | 0 | 0 | 1 | 1 | 1 | 1 | ↓B↓FB | 0x03 |
| 1 | 0 | 0 | 1 | 0 | 0 | 0 | 0 | ↑T | 0x0F |
| 1 | 0 | 0 | 1 | 0 | 0 | 0 | 1 | ↑T↑FB | 0x0F |
| 1 | 0 | 0 | 1 | 0 | 0 | 1 | 0 | ↑T | 0x0F |
| 1 | 0 | 0 | 1 | 0 | 0 | 1 | 1 | ↑T↓FB | 0x00 |
| 1 | 0 | 0 | 1 | 0 | 1 | 0 | 0 | ↑T↑B | 0x06 |
| 1 | 0 | 0 | 1 | 0 | 1 | 0 | 1 | ↑T↑B↑FB | 0x0F |
| 1 | 0 | 0 | 1 | 0 | 1 | 1 | 0 | ↑T↑B | 0x06 |
| 1 | 0 | 0 | 1 | 0 | 1 | 1 | 1 | ↑T↑B↓FB | 0x0F |
| 1 | 0 | 0 | 1 | 1 | 0 | 0 | 0 | ↑T | 0x0F |
| 1 | 0 | 0 | 1 | 1 | 0 | 0 | 1 | ↑T↑FB | 0x0F |
| 1 | 0 | 0 | 1 | 1 | 0 | 1 | 0 | ↑T | 0x0F |
| 1 | 0 | 0 | 1 | 1 | 0 | 1 | 1 | ↑T↓FB | 0x00 |
| 1 | 0 | 0 | 1 | 1 | 1 | 0 | 0 | ↑T↓B | 0x04 |
| 1 | 0 | 0 | 1 | 1 | 1 | 0 | 1 | ↑T↓B↑FB | 0x0F |
| 1 | 0 | 0 | 1 | 1 | 1 | 1 | 0 | ↑T↓B | 0x04 |
| 1 | 0 | 0 | 1 | 1 | 1 | 1 | 1 | ↑T↓B↓FB | 0x0F |
| 1 | 0 | 1 | 0 | 0 | 0 | 0 | 0 | Flat | 0x0E |
| 1 | 0 | 1 | 0 | 0 | 0 | 0 | 1 | ↑FB | 0x0F |
| 1 | 0 | 1 | 0 | 0 | 0 | 1 | 0 | Flat | 0x0E |
| 1 | 0 | 1 | 0 | 0 | 0 | 1 | 1 | ↓FB | 0x0F |
| 1 | 0 | 1 | 0 | 0 | 1 | 0 | 0 | ↑B | 0x0F |
| 1 | 0 | 1 | 0 | 0 | 1 | 0 | 1 | ↑B↑FB | 0x02 |
| 1 | 0 | 1 | 0 | 0 | 1 | 1 | 0 | ↑B | 0x0F |
| 1 | 0 | 1 | 0 | 0 | 1 | 1 | 1 | ↑B↓FB | 0x0F |
| 1 | 0 | 1 | 0 | 1 | 0 | 0 | 0 | Flat | 0x0E |
| 1 | 0 | 1 | 0 | 1 | 0 | 0 | 1 | ↑FB | 0x0F |
| 1 | 0 | 1 | 0 | 1 | 0 | 1 | 0 | Flat | 0x0E |

TABLE 1-continued

Row Edge Encoding

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code Output Value |
|---|---|---|---|---|---|---|---|---|---|
| 1 | 0 | 1 | 0 | 1 | 0 | 1 | 1 | ↓FB | 0x0F |
| 1 | 0 | 1 | 0 | 1 | 1 | 0 | 0 | ↓B | 0x0F |
| 1 | 0 | 1 | 0 | 1 | 1 | 0 | 1 | ↓B↑FB | 0x0F |
| 1 | 0 | 1 | 0 | 1 | 1 | 1 | 0 | ↓B | 0x0F |
| 1 | 0 | 1 | 0 | 1 | 1 | 1 | 1 | ↓B↓FB | 0x03 |
| 1 | 0 | 1 | 1 | 0 | 0 | 0 | 0 | ↓T | 0x0F |
| 1 | 0 | 1 | 1 | 0 | 0 | 0 | 1 | ↓T↑FB | 0x01 |
| 1 | 0 | 1 | 1 | 0 | 0 | 1 | 0 | ↓T | 0x0F |
| 1 | 0 | 1 | 1 | 0 | 0 | 1 | 1 | ↓T↓FB | 0x0F |
| 1 | 0 | 1 | 1 | 0 | 1 | 0 | 0 | ↓T↑B | 0x05 |
| 1 | 0 | 1 | 1 | 0 | 1 | 0 | 1 | ↓T↑B↑FB | 0x0F |
| 1 | 0 | 1 | 1 | 0 | 1 | 1 | 0 | ↓T↑B | 0x05 |
| 1 | 0 | 1 | 1 | 0 | 1 | 1 | 1 | ↓T↑B↓FB | 0x0F |
| 1 | 0 | 1 | 1 | 1 | 0 | 0 | 0 | ↓T | 0x0F |
| 1 | 0 | 1 | 1 | 1 | 0 | 0 | 1 | ↓T↑FB | 0x01 |
| 1 | 0 | 1 | 1 | 1 | 0 | 1 | 0 | ↓T | 0x0F |
| 1 | 0 | 1 | 1 | 1 | 0 | 1 | 1 | ↓T↓FB | 0x0F |
| 1 | 0 | 1 | 1 | 1 | 1 | 0 | 0 | ↓T↓B | 0x07 |
| 1 | 0 | 1 | 1 | 1 | 1 | 0 | 1 | ↓T↓B↑FB | 0x0F |
| 1 | 0 | 1 | 1 | 1 | 1 | 1 | 0 | ↓T↓B | 0x07 |
| 1 | 0 | 1 | 1 | 1 | 1 | 1 | 1 | ↓T↓B↓FB | 0x0F |
| 1 | 1 | 0 | 0 | 0 | 0 | 0 | 0 | ↓FT | 0x0F |
| 1 | 1 | 0 | 0 | 0 | 0 | 0 | 1 | ↓FT↑FB | 0x0F |
| 1 | 1 | 0 | 0 | 0 | 0 | 1 | 0 | ↓FT | 0x0F |
| 1 | 1 | 0 | 0 | 0 | 0 | 1 | 1 | ↓FT↓FB | 0x0F |
| 1 | 1 | 0 | 0 | 0 | 1 | 0 | 0 | ↓FT↑B | 0x0D |
| 1 | 1 | 0 | 0 | 0 | 1 | 0 | 1 | ↓FT↑B↑FB | 0x0F |
| 1 | 1 | 0 | 0 | 0 | 1 | 1 | 0 | ↓FT↑B | 0x0D |
| 1 | 1 | 0 | 0 | 0 | 1 | 1 | 1 | ↓FT↑B↓FB | 0x0F |
| 1 | 1 | 0 | 0 | 1 | 0 | 0 | 0 | ↓FT | 0x0F |
| 1 | 1 | 0 | 0 | 1 | 0 | 0 | 1 | ↓FT↑FB | 0x0F |
| 1 | 1 | 0 | 0 | 1 | 0 | 1 | 0 | ↓FT | 0x0F |
| 1 | 1 | 0 | 0 | 1 | 0 | 1 | 1 | ↓FT↓FB | 0x0F |
| 1 | 1 | 0 | 0 | 1 | 1 | 0 | 0 | ↓FT↓B | 0x0F |
| 1 | 1 | 0 | 0 | 1 | 1 | 0 | 1 | ↓FT↓B↑FB | 0x0F |
| 1 | 1 | 0 | 0 | 1 | 1 | 1 | 0 | ↓FT↓B | 0x0F |
| 1 | 1 | 0 | 0 | 1 | 1 | 1 | 1 | ↓FT↓B↓FB | 0x0F |
| 1 | 1 | 0 | 1 | 0 | 0 | 0 | 0 | ↓FT↑T | 0x0F |
| 1 | 1 | 0 | 1 | 0 | 0 | 0 | 1 | ↓FT↑T↑FB | 0x0F |
| 1 | 1 | 0 | 1 | 0 | 0 | 1 | 0 | ↓FT↑T | 0x0F |
| 1 | 1 | 0 | 1 | 0 | 0 | 1 | 1 | ↓FT↑T↓FB | 0x0F |
| 1 | 1 | 0 | 1 | 0 | 1 | 0 | 0 | ↓FT↑T↑B | 0x0F |
| 1 | 1 | 0 | 1 | 0 | 1 | 0 | 1 | ↓FT↑T↑B↑FB | 0x0F |
| 1 | 1 | 0 | 1 | 0 | 1 | 1 | 0 | ↓FT↑T↑B | 0x0F |
| 1 | 1 | 0 | 1 | 0 | 1 | 1 | 1 | ↓FT↑T↑B↓FB | 0x0F |
| 1 | 1 | 0 | 1 | 1 | 0 | 0 | 0 | ↓FT↑T | 0x0F |
| 1 | 1 | 0 | 1 | 1 | 0 | 0 | 1 | ↓FT↑T↑FB | 0x0F |
| 1 | 1 | 0 | 1 | 1 | 0 | 1 | 0 | ↓FT↑T | 0x0F |
| 1 | 1 | 0 | 1 | 1 | 0 | 1 | 1 | ↓FT↑T↓FB | 0x0F |
| 1 | 1 | 0 | 1 | 1 | 1 | 0 | 0 | ↓FT↑T↓B | 0x0F |
| 1 | 1 | 0 | 1 | 1 | 1 | 0 | 1 | ↓FT↑T↓B↑FB | 0x0F |
| 1 | 1 | 0 | 1 | 1 | 1 | 1 | 0 | ↓FT↑T↓B | 0x0F |
| 1 | 1 | 0 | 1 | 1 | 1 | 1 | 1 | ↓FT↑T↓B↓FB | 0x0F |
| 1 | 1 | 1 | 0 | 0 | 0 | 0 | 0 | ↓FT | 0x0F |
| 1 | 1 | 1 | 0 | 0 | 0 | 0 | 1 | ↓FT↑FB | 0x0F |
| 1 | 1 | 1 | 0 | 0 | 0 | 1 | 0 | ↓FT | 0x0F |
| 1 | 1 | 1 | 0 | 0 | 0 | 1 | 1 | ↓FT↓FB | 0x0F |
| 1 | 1 | 1 | 0 | 0 | 1 | 0 | 0 | ↓FT↑B | 0x0D |
| 1 | 1 | 1 | 0 | 0 | 1 | 0 | 1 | ↓FT↑B↑FB | 0x0F |
| 1 | 1 | 1 | 0 | 0 | 1 | 1 | 0 | ↓FT↑B | 0x0D |
| 1 | 1 | 1 | 0 | 0 | 1 | 1 | 1 | ↓FT↑B↓FB | 0x0F |
| 1 | 1 | 1 | 0 | 1 | 0 | 0 | 0 | ↓FT | 0x0F |
| 1 | 1 | 1 | 0 | 1 | 0 | 0 | 1 | ↓FT↑FB | 0x0F |
| 1 | 1 | 1 | 0 | 1 | 0 | 1 | 0 | ↓FT | 0x0F |
| 1 | 1 | 1 | 0 | 1 | 0 | 1 | 1 | ↓FT↓FB | 0x0F |
| 1 | 1 | 1 | 0 | 1 | 1 | 0 | 0 | ↓FT↓B | 0x0F |
| 1 | 1 | 1 | 0 | 1 | 1 | 0 | 1 | ↓FT↓B↑FB | 0x0F |
| 1 | 1 | 1 | 0 | 1 | 1 | 1 | 0 | ↓FT↓B | 0x0F |
| 1 | 1 | 1 | 0 | 1 | 1 | 1 | 1 | ↓FT↓B↓FB | 0x0F |
| 1 | 1 | 1 | 1 | 0 | 0 | 0 | 0 | ↓FT↓T | 0x0B |

TABLE 1-continued

Row Edge Encoding

| Edge Slope States | | | | | | | | Edge State Code Output Value |
|---|---|---|---|---|---|---|---|---|
| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description |
| 1 | 1 | 1 | 1 | 0 | 0 | 0 | 1 | ↓FT↓T↑FB | 0x0F |
| 1 | 1 | 1 | 1 | 0 | 0 | 1 | 0 | ↓FT↓T | 0x0B |
| 1 | 1 | 1 | 1 | 0 | 0 | 1 | 1 | ↓FT↓T↓FB | 0x0F |
| 1 | 1 | 1 | 1 | 0 | 1 | 0 | 0 | ↓FT↓T↑B | 0x0F |
| 1 | 1 | 1 | 1 | 0 | 1 | 0 | 1 | ↓FT↓T↑B↑FB | 0x0F |
| 1 | 1 | 1 | 1 | 0 | 1 | 1 | 0 | ↓FT↓T↑B | 0x0F |
| 1 | 1 | 1 | 1 | 0 | 1 | 1 | 1 | ↓FT↓T↑B↓FB | 0x0F |
| 1 | 1 | 1 | 1 | 1 | 0 | 0 | 0 | ↓FT↓T | 0x0B |
| 1 | 1 | 1 | 1 | 1 | 0 | 0 | 1 | ↓FT↓T↓FB | 0x0F |
| 1 | 1 | 1 | 1 | 1 | 0 | 1 | 0 | ↓FT↓T | 0x0B |
| 1 | 1 | 1 | 1 | 1 | 0 | 1 | 1 | ↓FT↓T↓FB | 0x0F |
| 1 | 1 | 1 | 1 | 1 | 1 | 0 | 0 | ↓FT↓T↓B | 0x0F |
| 1 | 1 | 1 | 1 | 1 | 1 | 0 | 1 | ↓FT↓T↓B↑FB | 0x0F |
| 1 | 1 | 1 | 1 | 1 | 1 | 1 | 0 | ↓FT↓T↓B | 0x0F |
| 1 | 1 | 1 | 1 | 1 | 1 | 1 | 1 | ↓FT↓T↓B↓FB | 0x0F |

TABLE 2

Notation used in Table 1.

| Notation | Meaning |
|---|---|
| FT | Far Top, indicates a significant edge between rows 0 and 1 |
| T | Top, indicates a significant edge between row 1 and 2 |
| B | Bottom, indicates a significant edge between rows 2 and 3 |
| FB | Far Bottom, indicates a significant edge between rows 3 and 4 |
| ↑ | indicates edge slope increases in the direction of increasing row number |
| ↓ | indicates edge slope decreases in the direction of increasing row number |
| Flat | Flat, indicates absence of a significant edge |

To understand the codes used in the table consider the following examples. The edge state description ↑B↑FB having code 0x02 refers to a significant increasing-value edge between rows 2 and 3 and a significant increasing-value edge between rows 3 and 4. The edge state description ↑T↓B↓FB having code 0x00 refers to a significant increasing edge between rows 1 and 2, a significant decreasing edge between rows 2 and 3, and a significant decreasing edge between rows 3 and 4. Since each of FT, T, B, and FB can be in one of 3 states in this table (increasing, decreasing, not significant), 81 states are possible requiring 7 bits of coding. Practically, not all of these states are important to real edge-identification applications. It has been found that 4 to 6 bits can encode the useful states for most applications. Table 1 provides a 4-bit example.

As stated above, more than one orientation of vectors may be employed, and the multiple orientation edge-state codes can be mapped at block 655 through an additional encoding process to arrive at an output edge-state code. To understand the multiple orientation aspect of this embodiment of the invention, consider the application of finding a corner pixel. In particular, assume that we wish to indicate that a corner covers pixels $p_{33}$, $p_{34}$, $p_{43}$, $p_{44}$, and the edge identification processor is employing horizontal vectors (rows) and vertical vectors (columns). The definition of the vertical edge states are analogous to the horizontal states, with FL (Far Left), L (Left), Right (Right), FR (Far Right) being analogous to FT, T, B, FB respectively. A corner covering $p_{33}$, $p_{34}$, $p_{43}$, $p_{44}$ would result in the codes for ↑B (0x04) and ↑R (0x04), from the row-edge encoding table and the column edge-encoding table, respectively. When these two codes are received by an encoder for multiple orientations, a code would be generated for the $p_{33}$-$p_{34}$-$p_{43}$-$p_{44}$-type corner. An example of a table for encoding an overall edge state from orientation edge states is given below in Table 2. In this example, the table coverts 4 bits from the horizontal codes and 4 bits from the vertical codes to 8 bits for an overall edge state code. Due to the equality of input and output bits in this example, the table can be rather straightforward, in that we can construct the output as a concatenation of the input bits.

TABLE 3

An example of a table encoding an overall edge state from orientation edge states.

| Horizontal Edge State Code | Vertical Edge State Code | Overall Edge State Code |
|---|---|---|
| 0x00 | 0x00 | 0x00 |
| 0x00 | 0x01 | 0x01 |
| 0x00 | 0x02 | 0x02 |
| 0x00 | 0x03 | 0x03 |
| 0x00 | 0x04 | 0x04 |
| 0x00 | 0x05 | 0x05 |
| 0x00 | 0x06 | 0x06 |
| 0x00 | 0x07 | 0x07 |
| 0x00 | 0x08 | 0x08 |
| 0x00 | 0x09 | 0x09 |
| 0x00 | 0x0A | 0x0A |
| 0x00 | 0x0B | 0x0B |
| 0x00 | 0x0C | 0x0C |
| 0x00 | 0x0D | 0x0D |
| 0x00 | 0x0E | 0x0E |
| 0x00 | 0x0F | 0x0F |
| 0x01 | 0x00 | 0x10 |
| 0x01 | 0x01 | 0x11 |
| 0x01 | 0x02 | 0x12 |
| 0x01 | 0x03 | 0x13 |
| 0x01 | 0x04 | 0x14 |
| 0x01 | 0x05 | 0x15 |
| 0x01 | 0x06 | 0x16 |
| 0x01 | 0x07 | 0x17 |
| 0x01 | 0x08 | 0x18 |
| 0x01 | 0x09 | 0x19 |
| 0x01 | 0x0A | 0x1A |
| 0x01 | 0x0B | 0x1B |

TABLE 3-continued

An example of a table encoding an overall edge state from orientation edge states.

| Horizontal Edge State Code | Vertical Edge State Code | Overall Edge State Code |
|---|---|---|
| 0x01 | 0x0C | 0x1C |
| 0x01 | 0x0D | 0x1D |
| 0x01 | 0x0E | 0x1E |
| 0x01 | 0x0F | 0x1F |
| 0x02 | 0x00 | 0x20 |
| 0x02 | 0x01 | 0x21 |
| 0x02 | 0x02 | 0x22 |
| 0x02 | 0x03 | 0x23 |
| 0x02 | 0x04 | 0x24 |
| 0x02 | 0x05 | 0x25 |
| 0x02 | 0x06 | 0x26 |
| 0x02 | 0x07 | 0x27 |
| 0x02 | 0x08 | 0x28 |
| 0x02 | 0x09 | 0x29 |
| 0x02 | 0x0A | 0x2A |
| 0x02 | 0x0B | 0x2B |
| 0x02 | 0x0C | 0x2C |
| 0x02 | 0x0D | 0x2D |
| 0x02 | 0x0E | 0x2E |
| 0x02 | 0x0F | 0x2F |
| 0x03 | 0x00 | 0x30 |
| 0x03 | 0x01 | 0x31 |
| 0x03 | 0x02 | 0x32 |
| 0x03 | 0x03 | 0x33 |
| 0x03 | 0x04 | 0x34 |
| 0x03 | 0x05 | 0x35 |
| 0x03 | 0x06 | 0x36 |
| 0x03 | 0x07 | 0x37 |
| 0x03 | 0x08 | 0x38 |
| 0x03 | 0x09 | 0x39 |
| 0x03 | 0x0A | 0x3A |
| 0x03 | 0x0B | 0x3B |
| 0x03 | 0x0C | 0x3C |
| 0x03 | 0x0D | 0x3D |
| 0x03 | 0x0E | 0x3E |
| 0x03 | 0x0F | 0x3F |
| 0x04 | 0x00 | 0x40 |
| 0x04 | 0x01 | 0x41 |
| 0x04 | 0x02 | 0x42 |
| 0x04 | 0x03 | 0x43 |
| 0x04 | 0x04 | 0x44 |
| 0x04 | 0x05 | 0x45 |
| 0x04 | 0x06 | 0x46 |
| 0x04 | 0x07 | 0x47 |
| 0x04 | 0x08 | 0x48 |
| 0x04 | 0x09 | 0x49 |
| 0x04 | 0x0A | 0x4A |
| 0x04 | 0x0B | 0x4B |
| 0x04 | 0x0C | 0x4C |
| 0x04 | 0x0D | 0x4D |
| 0x04 | 0x0E | 0x4E |
| 0x04 | 0x0F | 0x4F |
| 0x05 | 0x00 | 0x50 |
| 0x05 | 0x01 | 0x51 |
| 0x05 | 0x02 | 0x52 |
| 0x05 | 0x03 | 0x53 |
| 0x05 | 0x04 | 0x54 |
| 0x05 | 0x05 | 0x55 |
| 0x05 | 0x06 | 0x56 |
| 0x05 | 0x07 | 0x57 |
| 0x05 | 0x08 | 0x58 |
| 0x05 | 0x09 | 0x59 |
| 0x05 | 0x0A | 0x5A |
| 0x05 | 0x0B | 0x5B |
| 0x05 | 0x0C | 0x5C |
| 0x05 | 0x0D | 0x5D |
| 0x05 | 0x0E | 0x5E |
| 0x05 | 0x0F | 0x5F |
| 0x06 | 0x00 | 0x60 |
| 0x06 | 0x01 | 0x61 |
| 0x06 | 0x02 | 0x62 |
| 0x06 | 0x03 | 0x63 |
| 0x06 | 0x04 | 0x64 |
| 0x06 | 0x05 | 0x65 |
| 0x06 | 0x06 | 0x66 |
| 0x06 | 0x07 | 0x67 |
| 0x06 | 0x08 | 0x68 |
| 0x06 | 0x09 | 0x69 |
| 0x06 | 0x0A | 0x6A |
| 0x06 | 0x0B | 0x6B |
| 0x06 | 0x0C | 0x6C |
| 0x06 | 0x0D | 0x6D |
| 0x06 | 0x0E | 0x6E |
| 0x06 | 0x0F | 0x6F |
| 0x07 | 0x00 | 0x70 |
| 0x07 | 0x01 | 0x71 |
| 0x07 | 0x02 | 0x72 |
| 0x07 | 0x03 | 0x73 |
| 0x07 | 0x04 | 0x74 |
| 0x07 | 0x05 | 0x75 |
| 0x07 | 0x06 | 0x76 |
| 0x07 | 0x07 | 0x77 |
| 0x07 | 0x08 | 0x78 |
| 0x07 | 0x09 | 0x79 |
| 0x07 | 0x0A | 0x7A |
| 0x07 | 0x0B | 0x7B |
| 0x07 | 0x0C | 0x7C |
| 0x07 | 0x0D | 0x7D |
| 0x07 | 0x0E | 0x7E |
| 0x07 | 0x0F | 0x7F |
| 0x08 | 0x00 | 0x80 |
| 0x08 | 0x01 | 0x81 |
| 0x08 | 0x02 | 0x82 |
| 0x08 | 0x03 | 0x83 |
| 0x08 | 0x04 | 0x84 |
| 0x08 | 0x05 | 0x85 |
| 0x08 | 0x06 | 0x86 |
| 0x08 | 0x07 | 0x87 |
| 0x08 | 0x08 | 0x88 |
| 0x08 | 0x09 | 0x89 |
| 0x08 | 0x0A | 0x8A |
| 0x08 | 0x0B | 0x8B |
| 0x08 | 0x0C | 0x8C |
| 0x08 | 0x0D | 0x8D |
| 0x08 | 0x0E | 0x8E |
| 0x08 | 0x0F | 0x8F |
| 0x09 | 0x00 | 0x90 |
| 0x09 | 0x01 | 0x91 |
| 0x09 | 0x02 | 0x92 |
| 0x09 | 0x03 | 0x93 |
| 0x09 | 0x04 | 0x94 |
| 0x09 | 0x05 | 0x95 |
| 0x09 | 0x06 | 0x96 |
| 0x09 | 0x07 | 0x97 |
| 0x09 | 0x08 | 0x98 |
| 0x09 | 0x09 | 0x99 |
| 0x09 | 0x0A | 0x9A |
| 0x09 | 0x0B | 0x9B |
| 0x09 | 0x0C | 0x9C |
| 0x09 | 0x0D | 0x9D |
| 0x09 | 0x0E | 0x9E |
| 0x09 | 0x0F | 0x9F |
| 0x0A | 0x00 | 0xA0 |
| 0x0A | 0x01 | 0xA1 |
| 0x0A | 0x02 | 0xA2 |
| 0x0A | 0x03 | 0xA3 |
| 0x0A | 0x04 | 0xA4 |
| 0x0A | 0x05 | 0xA5 |
| 0x0A | 0x06 | 0xA6 |
| 0x0A | 0x07 | 0xA7 |
| 0x0A | 0x08 | 0xA8 |
| 0x0A | 0x09 | 0xA9 |
| 0x0A | 0x0A | 0xAA |
| 0x0A | 0x0B | 0xAB |
| 0x0A | 0x0C | 0xAC |
| 0x0A | 0x0D | 0xAD |

TABLE 3-continued

An example of a table encoding an overall edge state from orientation edge states.

| Horizontal Edge State Code | Vertical Edge State Code | Overall Edge State Code |
|---|---|---|
| 0x0A | 0x0E | 0xAE |
| 0x0A | 0x0F | 0xAF |
| 0x0B | 0x00 | 0xB0 |
| 0x0B | 0x01 | 0xB1 |
| 0x0B | 0x02 | 0xB2 |
| 0x0B | 0x03 | 0xB3 |
| 0x0B | 0x04 | 0xB4 |
| 0x0B | 0x05 | 0xB5 |
| 0x0B | 0x06 | 0xB6 |
| 0x0B | 0x07 | 0xB7 |
| 0x0B | 0x08 | 0xB8 |
| 0x0B | 0x09 | 0xB9 |
| 0x0B | 0x0A | 0xBA |
| 0x0B | 0x0B | 0xBB |
| 0x0B | 0x0C | 0xBC |
| 0x0B | 0x0D | 0xBD |
| 0x0B | 0x0E | 0xBE |
| 0x0B | 0x0F | 0xBF |
| 0x0C | 0x00 | 0xC0 |
| 0x0C | 0x01 | 0xC1 |
| 0x0C | 0x02 | 0xC2 |
| 0x0C | 0x03 | 0xC3 |
| 0x0C | 0x04 | 0xC4 |
| 0x0C | 0x05 | 0xC5 |
| 0x0C | 0x06 | 0xC6 |
| 0x0C | 0x07 | 0xC7 |
| 0x0C | 0x08 | 0xC8 |
| 0x0C | 0x09 | 0xC9 |
| 0x0C | 0x0A | 0xCA |
| 0x0C | 0x0B | 0xCB |
| 0x0C | 0x0C | 0xCC |
| 0x0C | 0x0D | 0xCD |
| 0x0C | 0x0E | 0xCE |
| 0x0C | 0x0F | 0xCF |
| 0x0D | 0x00 | 0xD0 |
| 0x0D | 0x01 | 0xD1 |
| 0x0D | 0x02 | 0xD2 |
| 0x0D | 0x03 | 0xD3 |
| 0x0D | 0x04 | 0xD4 |
| 0x0D | 0x05 | 0xD5 |
| 0x0D | 0x06 | 0xD6 |
| 0x0D | 0x07 | 0xD7 |
| 0x0D | 0x08 | 0xD8 |
| 0x0D | 0x09 | 0xD9 |
| 0x0D | 0x0A | 0xDA |
| 0x0D | 0x0B | 0xDB |
| 0x0D | 0x0C | 0xDC |
| 0x0D | 0x0D | 0xDD |
| 0x0D | 0x0E | 0xDE |
| 0x0D | 0x0F | 0xDF |
| 0x0E | 0x00 | 0xE0 |
| 0x0E | 0x01 | 0xE1 |
| 0x0E | 0x02 | 0xE2 |
| 0x0E | 0x03 | 0xE3 |
| 0x0E | 0x04 | 0xE4 |
| 0x0E | 0x05 | 0xE5 |
| 0x0E | 0x06 | 0xE6 |
| 0x0E | 0x07 | 0xE7 |
| 0x0E | 0x08 | 0xE8 |
| 0x0E | 0x09 | 0xE9 |
| 0x0E | 0x0A | 0xEA |
| 0x0E | 0x0B | 0xEB |
| 0x0E | 0x0C | 0xEC |
| 0x0E | 0x0D | 0xED |
| 0x0E | 0x0E | 0xEE |
| 0x0E | 0x0F | 0xEF |
| 0x0F | 0x00 | 0xF0 |
| 0x0F | 0x01 | 0xF1 |
| 0x0F | 0x02 | 0xF2 |
| 0x0F | 0x03 | 0xF3 |
| 0x0F | 0x04 | 0xF4 |
| 0x0F | 0x05 | 0xF5 |
| 0x0F | 0x06 | 0xF6 |
| 0x0F | 0x07 | 0xF7 |
| 0x0F | 0x08 | 0xF8 |
| 0x0F | 0x09 | 0xF9 |
| 0x0F | 0x0A | 0xFA |
| 0x0F | 0x0B | 0xFB |
| 0x0F | 0x0C | 0xFC |
| 0x0F | 0x0D | 0xFD |
| 0x0F | 0x0F | 0xFE |
| 0x0F | 0x0F | 0xFF |

Figure 7A:
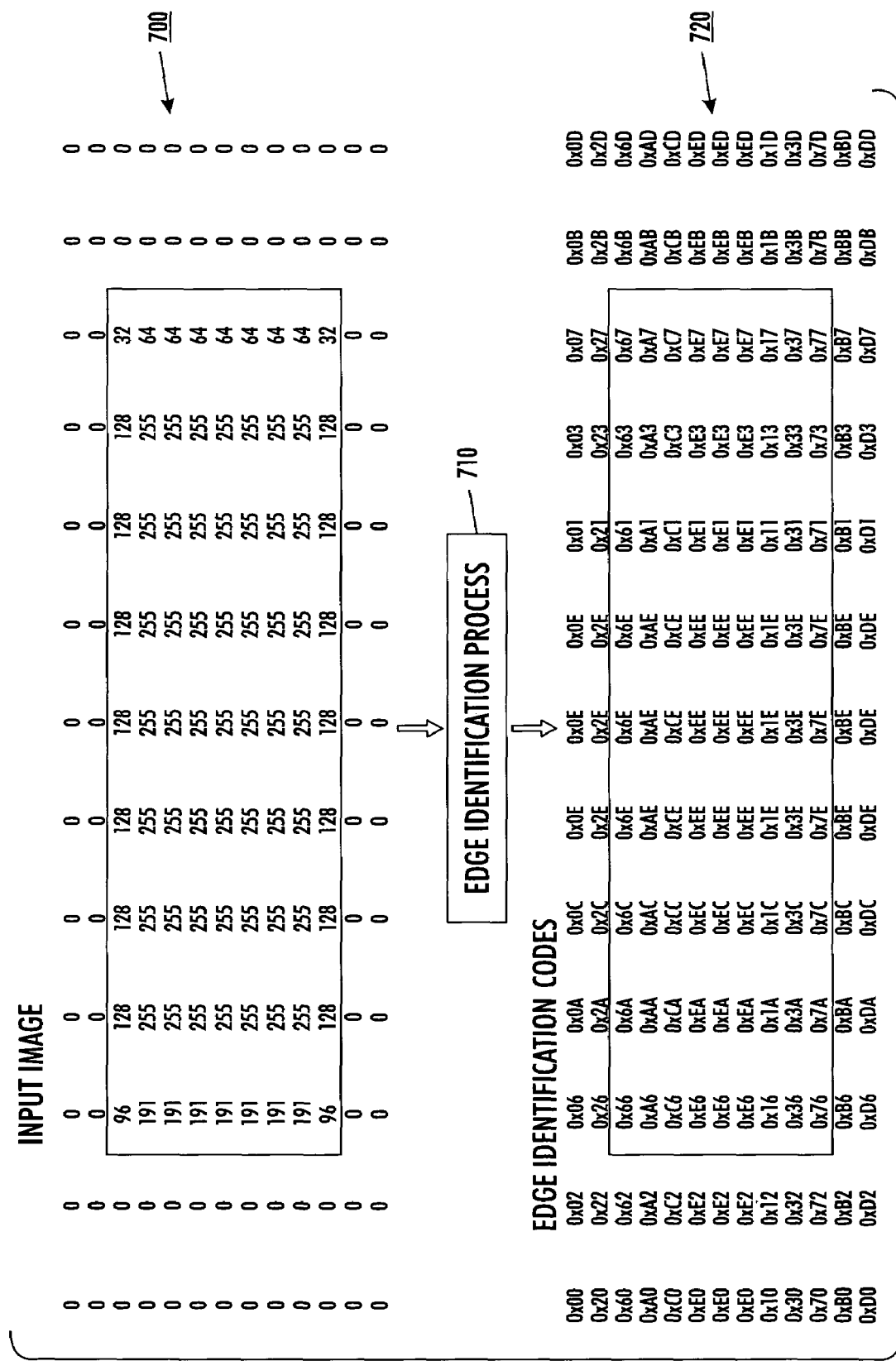
FIG. 7 is an exemplary input digital image possessing edges and an array of output edge identification codes according to the teachings presented herein.

As indicated above, there are several types of anti-aliased pixels that we wish to identify for rendering with AAR. Recognition of high-contrast neighbor anti-aliased pixels can achieved by selecting the cases where there is a succession of two rising, or two falling pixel values. FIG. 7A shows an example of identification of anti-aliased pixels with high contrast neighbors. Image 700 which possesses anti-aliased pixels with high contrast neighbors, is input to the AAT step 710, which generates corresponding output codes 720 that identify the anti-anti-aliased pixels. Examples of codes for identified anti-aliased pixels are 0x6E and 07E for horizontal edges, and 0xE6 and 0xE7 and for vertical edges. Anti-aliased corner pixels can be determined by combinations of orientation edge-state codes where there are two successive rising and falling states in at least one of the orientations. Examples are 0x66, 0x67, 0x76, 0x77.

Fine feature anti-aliased pixels can be identified by selecting pixels possessing an edge state code that indicate nearby rising and falling states. For example, considering vectors of horizontal orientation, the following codes indicate that a fine feature is in the observation window 0x04 (↑T↓B), 0x0C (↑FT↓B), 0x00 (↑T↓FB), 0x05 (↓T↑B), 0x0D (↓FT↑B), 0x1 (↓T↑FB).

Figure 7B:
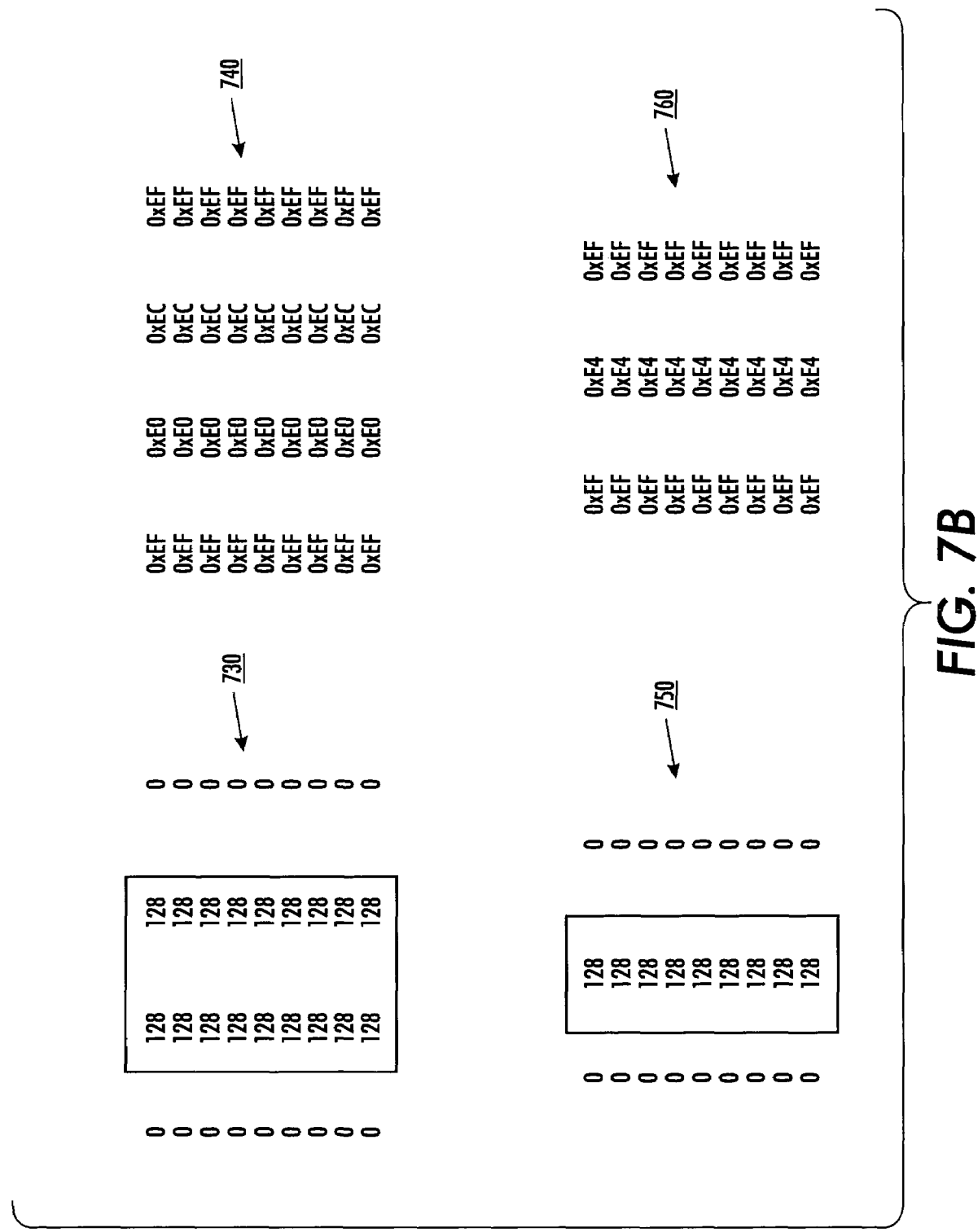

FIG. 7B provides examples of identifying fine feature anti-aliased pixels. Image segments are shown for a 1-pixel wide vertical anti-aliased line 750 and a two pixel wide vertical anti-aliased line 730. Identification codes for the image segment possessing the 1-pixel-wide line 760 are show that the anti-aliased fine features are identified by 0xE4. Identification codes for the image segment possessing the 2-pixel-wide line 740 are show that the anti-aliased fine features are identified by 0xE0 and 0xEC.

Alternative table entries can be utilized in the look-up tables that encode edges (e.g., 645 650) to identify gray edge pixels of gray image objects. An example of a look-up table that provides that capability is provided in Table 4.

TABLE 4

Alternative Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 0 | 0 | 0 | 0 | 0 | 0 | 0 | 0 | Flat | 0x0E |
| 0 | 0 | 0 | 0 | 0 | 0 | 0 | 1 | ↑FB | 0x00 |
| 0 | 0 | 0 | 0 | 0 | 0 | 1 | 0 | Flat | 0x0E |
| 0 | 0 | 0 | 0 | 0 | 0 | 1 | 1 | ↓FB | 0x01 |
| 0 | 0 | 0 | 0 | 0 | 1 | 0 | 0 | ↑B | 0x04 |
| 0 | 0 | 0 | 0 | 0 | 1 | 0 | 1 | ↑B↑FB | 0x02 |
| 0 | 0 | 0 | 0 | 0 | 1 | 1 | 0 | ↑B | 0x04 |
| 0 | 0 | 0 | 0 | 0 | 1 | 1 | 1 | ↑B↓FB | 0x0F |
| 0 | 0 | 0 | 0 | 1 | 0 | 0 | 0 | Flat | 0x0E |
| 0 | 0 | 0 | 0 | 1 | 0 | 0 | 1 | ↑FB | 0x00 |
| 0 | 0 | 0 | 0 | 1 | 0 | 1 | 0 | Flat | 0x0E |
| 0 | 0 | 0 | 0 | 1 | 0 | 1 | 1 | ↓FB | 0x01 |
| 0 | 0 | 0 | 0 | 1 | 1 | 0 | 0 | ↓B | 0x05 |
| 0 | 0 | 0 | 0 | 1 | 1 | 0 | 1 | ↓B↑FB | 0x0F |
| 0 | 0 | 0 | 0 | 1 | 1 | 1 | 0 | ↓B | 0x05 |
| 0 | 0 | 0 | 0 | 1 | 1 | 1 | 1 | ↓B↓FB | 0x03 |
| 0 | 0 | 0 | 1 | 0 | 0 | 0 | 0 | ↑T | 0x08 |
| 0 | 0 | 0 | 1 | 0 | 0 | 0 | 1 | ↑T↑FB | 0x0F |
| 0 | 0 | 0 | 1 | 0 | 0 | 1 | 0 | ↑T | 0x08 |
| 0 | 0 | 0 | 1 | 0 | 0 | 1 | 1 | ↑T↓FB | 0x0F |
| 0 | 0 | 0 | 1 | 0 | 1 | 0 | 0 | ↑T↑B | 0x06 |
| 0 | 0 | 0 | 1 | 0 | 1 | 0 | 1 | ↑T↑B↑FB | 0x0F |
| 0 | 0 | 0 | 1 | 0 | 1 | 1 | 0 | ↑T↑B | 0x06 |
| 0 | 0 | 0 | 1 | 0 | 1 | 1 | 1 | ↑T↑B↓FB | 0x0F |
| 0 | 0 | 0 | 1 | 1 | 0 | 0 | 0 | ↑T | 0x08 |
| 0 | 0 | 0 | 1 | 1 | 0 | 0 | 1 | ↑T↑FB | 0x0F |
| 0 | 0 | 0 | 1 | 1 | 0 | 1 | 0 | ↑T | 0x08 |
| 0 | 0 | 0 | 1 | 1 | 0 | 1 | 1 | ↑T↓FB | 0x0F |
| 0 | 0 | 0 | 1 | 1 | 1 | 0 | 0 | ↑T↓B | 0x0F |
| 0 | 0 | 0 | 1 | 1 | 1 | 0 | 1 | ↑T↓B↑FB | 0x0F |
| 0 | 0 | 0 | 1 | 1 | 1 | 1 | 0 | ↑T↓B | 0x0F |
| 0 | 0 | 0 | 1 | 1 | 1 | 1 | 1 | ↑T↓B↓FB | 0x0F |
| 0 | 0 | 1 | 0 | 0 | 0 | 0 | 0 | Flat | 0x0E |
| 0 | 0 | 1 | 0 | 0 | 0 | 0 | 1 | ↑FB | 0x00 |
| 0 | 0 | 1 | 0 | 0 | 0 | 1 | 0 | Flat | 0x0E |
| 0 | 0 | 1 | 0 | 0 | 0 | 1 | 1 | ↓FB | 0x01 |
| 0 | 0 | 1 | 0 | 0 | 1 | 0 | 0 | ↑B | 0x04 |
| 0 | 0 | 1 | 0 | 0 | 1 | 0 | 1 | ↑B↑FB | 0x02 |
| 0 | 0 | 1 | 0 | 0 | 1 | 1 | 0 | ↑B | 0x04 |
| 0 | 0 | 1 | 0 | 0 | 1 | 1 | 1 | ↑B↓FB | 0x0F |
| 0 | 0 | 1 | 0 | 1 | 0 | 0 | 0 | Flat | 0x0E |
| 0 | 0 | 1 | 0 | 1 | 0 | 0 | 1 | ↑FB | 0x00 |
| 0 | 0 | 1 | 0 | 1 | 0 | 1 | 0 | Flat | 0x0E |
| 0 | 0 | 1 | 0 | 1 | 0 | 1 | 1 | ↓FB | 0x01 |
| 0 | 0 | 1 | 0 | 1 | 1 | 0 | 0 | ↓B | 0x05 |
| 0 | 0 | 1 | 0 | 1 | 1 | 0 | 1 | ↓B↑FB | 0x0F |
| 0 | 0 | 1 | 0 | 1 | 1 | 1 | 0 | ↓B | 0x05 |
| 0 | 0 | 1 | 0 | 1 | 1 | 1 | 1 | ↓B↓FB | 0x03 |
| 0 | 0 | 1 | 1 | 0 | 0 | 0 | 0 | ↓T | 0x09 |
| 0 | 0 | 1 | 1 | 0 | 0 | 0 | 1 | ↓T↑FB | 0x0F |
| 0 | 0 | 1 | 1 | 0 | 0 | 1 | 0 | ↓T | 0x09 |
| 0 | 0 | 1 | 1 | 0 | 0 | 1 | 1 | ↓T↓FB | 0x0F |
| 0 | 0 | 1 | 1 | 0 | 1 | 0 | 0 | ↓T↑B | 0x0F |
| 0 | 0 | 1 | 1 | 0 | 1 | 0 | 1 | ↓T↑B↑FB | 0x0F |
| 0 | 0 | 1 | 1 | 0 | 1 | 1 | 0 | ↓T↑B | 0x0F |
| 0 | 0 | 1 | 1 | 0 | 1 | 1 | 1 | ↓T↑B↓FB | 0x0F |
| 0 | 0 | 1 | 1 | 1 | 0 | 0 | 0 | ↓T | 0x09 |
| 0 | 0 | 1 | 1 | 1 | 0 | 0 | 1 | ↓T↑FB | 0x0F |
| 0 | 0 | 1 | 1 | 1 | 0 | 1 | 0 | ↓T | 0x09 |
| 0 | 0 | 1 | 1 | 1 | 0 | 1 | 1 | ↓T↓FB | 0x0F |
| 0 | 0 | 1 | 1 | 1 | 1 | 0 | 0 | ↓T↓B | 0x07 |
| 0 | 0 | 1 | 1 | 1 | 1 | 0 | 1 | ↓T↓B↑FB | 0x0F |
| 0 | 0 | 1 | 1 | 1 | 1 | 1 | 0 | ↓T↓B | 0x07 |
| 0 | 0 | 1 | 1 | 1 | 1 | 1 | 1 | ↓T↓B↓FB | 0x0F |
| 0 | 1 | 0 | 0 | 0 | 0 | 0 | 0 | ↑FT | 0x0C |
| 0 | 1 | 0 | 0 | 0 | 0 | 0 | 1 | ↑FT↑FB | 0x0F |
| 0 | 1 | 0 | 0 | 0 | 0 | 1 | 0 | ↑FT | 0x0C |
| 0 | 1 | 0 | 0 | 0 | 0 | 1 | 1 | ↑FT↓FB | 0x0F |
| 0 | 1 | 0 | 0 | 0 | 1 | 0 | 0 | ↑FT↑B | 0x0F |
| 0 | 1 | 0 | 0 | 0 | 1 | 0 | 1 | ↑FT↑B↑FB | 0x0F |

TABLE 4-continued

Alternative Row Edge Encoding

Edge Slope States

| dY0 > 0<br>1 means<br>falling<br>edge | abs(dY0) > T<br>1 means<br>strong<br>edge | dY1 > 0<br>1 means<br>falling<br>edge | abs(dY1) > T<br>1 means<br>strong<br>edge | dY2 > 0<br>1 means<br>falling<br>edge | abs(dY2) > T<br>1 means<br>strong<br>edge | dY3 > 0<br>1 means<br>falling<br>edge | abs(dY3) > T<br>1 means<br>strong<br>edge | Edge State<br>Description | Edge<br>State<br>Code |
|---|---|---|---|---|---|---|---|---|---|
| 0 | 1 | 0 | 0 | 0 | 1 | 1 | 0 | ↑FT↑B | 0x0F |
| 0 | 1 | 0 | 0 | 0 | 1 | 1 | 1 | ↑FT↑B↓FB | 0x0F |
| 0 | 1 | 0 | 0 | 1 | 0 | 0 | 0 | ↑FT | 0x0C |
| 0 | 1 | 0 | 0 | 1 | 0 | 0 | 1 | ↑FT↑FB | 0x0F |
| 0 | 1 | 0 | 0 | 1 | 0 | 1 | 0 | ↑FT | 0x0C |
| 0 | 1 | 0 | 0 | 1 | 0 | 1 | 1 | ↑FT↓FB | 0x0F |
| 0 | 1 | 0 | 0 | 1 | 1 | 0 | 0 | ↑FT↓B | 0x0F |
| 0 | 1 | 0 | 0 | 1 | 1 | 0 | 1 | ↑FT↓B↑FB | 0x0F |
| 0 | 1 | 0 | 0 | 1 | 1 | 1 | 0 | ↑FT↓B | 0x0F |
| 0 | 1 | 0 | 0 | 1 | 1 | 1 | 1 | ↑FT↓B↓FB | 0x0F |
| 0 | 1 | 0 | 1 | 0 | 0 | 0 | 0 | ↑FT↑T | 0x0A |
| 0 | 1 | 0 | 1 | 0 | 0 | 0 | 1 | ↑FT↑T↑FB | 0x0F |
| 0 | 1 | 0 | 1 | 0 | 0 | 1 | 0 | ↑FT↑T | 0x0A |
| 0 | 1 | 0 | 1 | 0 | 0 | 1 | 1 | ↑FT↑T↓FB | 0x0F |
| 0 | 1 | 0 | 1 | 0 | 1 | 0 | 0 | ↑FT↑T↑B | 0x0F |
| 0 | 1 | 0 | 1 | 0 | 1 | 0 | 1 | ↑FT↑T↑B↑FB | 0x0F |
| 0 | 1 | 0 | 1 | 0 | 1 | 1 | 0 | ↑FT↑T↑B | 0x0F |
| 0 | 1 | 0 | 1 | 0 | 1 | 1 | 1 | ↑↑FT↑T↑B↓FB | 0x0F |
| 0 | 1 | 0 | 1 | 1 | 0 | 0 | 0 | ↑FT↑T | 0x0A |
| 0 | 1 | 0 | 1 | 1 | 0 | 0 | 1 | ↑FT↑T↑FB | 0x0F |
| 0 | 1 | 0 | 1 | 1 | 0 | 1 | 0 | ↑FT↑T | 0x0A |
| 0 | 1 | 0 | 1 | 1 | 0 | 1 | 1 | ↑FT↑T↓FB | 0x0F |
| 0 | 1 | 0 | 1 | 1 | 1 | 0 | 0 | ↑FT↑T↓B | 0x0F |
| 0 | 1 | 0 | 1 | 1 | 1 | 0 | 1 | ↑FT↑T↓B↑FB | 0x0F |
| 0 | 1 | 0 | 1 | 1 | 1 | 1 | 0 | ↑FT↑T↓B | 0x0F |
| 0 | 1 | 0 | 1 | 1 | 1 | 1 | 1 | ↑FT↑T↓B↓FB | 0x0F |
| 0 | 1 | 1 | 0 | 0 | 0 | 0 | 0 | ↑FT | 0x0C |
| 0 | 1 | 1 | 0 | 0 | 0 | 0 | 1 | ↑FT↑FB | 0x0F |
| 0 | 1 | 1 | 0 | 0 | 0 | 1 | 0 | ↑FT | 0x0C |
| 0 | 1 | 1 | 0 | 0 | 0 | 1 | 1 | ↑FT↓FB | 0x0F |
| 0 | 1 | 1 | 0 | 0 | 1 | 0 | 0 | ↑FT↑B | 0x0F |
| 0 | 1 | 1 | 0 | 0 | 1 | 0 | 1 | ↑FT↑B↑FB | 0x0F |
| 0 | 1 | 1 | 0 | 0 | 1 | 1 | 0 | ↑FT↑B | 0x0F |
| 0 | 1 | 1 | 0 | 0 | 1 | 1 | 1 | ↑FT↑B↓FB | 0x0F |
| 0 | 1 | 1 | 0 | 1 | 0 | 0 | 0 | ↑FT | 0x0C |
| 0 | 1 | 1 | 0 | 1 | 0 | 0 | 1 | ↑FT↑FB | 0x0F |
| 0 | 1 | 1 | 0 | 1 | 0 | 1 | 0 | ↑FT | 0x0C |
| 0 | 1 | 1 | 0 | 1 | 0 | 1 | 1 | ↑FT↓FB | 0x0F |
| 0 | 1 | 1 | 0 | 1 | 1 | 0 | 0 | ↑FT↓B | 0x0F |
| 0 | 1 | 1 | 0 | 1 | 1 | 0 | 1 | ↑FT↓B↑FB | 0x0F |
| 0 | 1 | 1 | 0 | 1 | 1 | 1 | 0 | ↑FT↓B | 0x0F |
| 0 | 1 | 1 | 0 | 1 | 1 | 1 | 1 | ↑FT↓B↓FB | 0x0F |
| 0 | 1 | 1 | 1 | 0 | 0 | 0 | 0 | ↑FT↓T | 0x0F |
| 0 | 1 | 1 | 1 | 0 | 0 | 0 | 1 | ↑FT↓T↑FB | 0x0F |
| 0 | 1 | 1 | 1 | 0 | 0 | 1 | 0 | ↑FT↓T | 0x0F |
| 0 | 1 | 1 | 1 | 0 | 0 | 1 | 1 | ↑FT↓T↓FB | 0x0F |
| 0 | 1 | 1 | 1 | 0 | 1 | 0 | 0 | ↑FT↓T↑B | 0x0F |
| 0 | 1 | 1 | 1 | 0 | 1 | 0 | 1 | ↑FT↓T↑B↑FB | 0x0F |
| 0 | 1 | 1 | 1 | 0 | 1 | 1 | 0 | ↑FT↓T↑B | 0x0F |
| 0 | 1 | 1 | 1 | 0 | 1 | 1 | 1 | ↑FT↓T↑B↓FB | 0x0F |
| 0 | 1 | 1 | 1 | 1 | 0 | 0 | 0 | ↑FT↓T | 0x0F |
| 0 | 1 | 1 | 1 | 1 | 0 | 0 | 1 | ↑FT↓T↑FB | 0x0F |
| 0 | 1 | 1 | 1 | 1 | 0 | 1 | 0 | ↑FT↓T | 0x0F |
| 0 | 1 | 1 | 1 | 1 | 0 | 1 | 1 | ↑FT↓T↓FB | 0x0F |
| 0 | 1 | 1 | 1 | 1 | 1 | 0 | 0 | ↑FT↓T↓B | 0x0F |
| 0 | 1 | 1 | 1 | 1 | 1 | 0 | 1 | ↑FT↓T↓B↑FB | 0x0F |
| 0 | 1 | 1 | 1 | 1 | 1 | 1 | 0 | ↑FT↓T↓B | 0x0F |
| 0 | 1 | 1 | 1 | 1 | 1 | 1 | 1 | ↑FT↓T↓B↓FB | 0x0F |
| 1 | 0 | 0 | 0 | 0 | 0 | 0 | 0 | Flat | 0x0E |
| 1 | 0 | 0 | 0 | 0 | 0 | 0 | 1 | ↑FB | 0x00 |
| 1 | 0 | 0 | 0 | 0 | 0 | 1 | 0 | Flat | 0x0E |
| 1 | 0 | 0 | 0 | 0 | 0 | 1 | 1 | ↓FB | 0x01 |
| 1 | 0 | 0 | 0 | 0 | 1 | 0 | 0 | ↑B | 0x04 |
| 1 | 0 | 0 | 0 | 0 | 1 | 0 | 1 | ↑B↑FB | 0x02 |
| 1 | 0 | 0 | 0 | 0 | 1 | 1 | 0 | ↑B | 0x04 |
| 1 | 0 | 0 | 0 | 0 | 1 | 1 | 1 | ↑B↓FB | 0x0F |
| 1 | 0 | 0 | 0 | 1 | 0 | 0 | 0 | Flat | 0x0E |
| 1 | 0 | 0 | 0 | 1 | 0 | 0 | 1 | ↑FB | 0x00 |
| 1 | 0 | 0 | 0 | 1 | 0 | 1 | 0 | Flat | 0x0E |
| 1 | 0 | 0 | 0 | 1 | 0 | 1 | 1 | ↓FB | 0x01 |

TABLE 4-continued

Alternative Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 1 | 0 | 0 | 0 | 1 | 1 | 0 | 0 | ↓B | 0x05 |
| 1 | 0 | 0 | 0 | 1 | 1 | 0 | 1 | ↓B↑FB | 0x0F |
| 1 | 0 | 0 | 0 | 1 | 1 | 1 | 0 | ↓B | 0x05 |
| 1 | 0 | 0 | 0 | 1 | 1 | 1 | 1 | ↓B↓FB | 0x03 |
| 1 | 0 | 0 | 1 | 0 | 0 | 0 | 0 | ↑T | 0x08 |
| 1 | 0 | 0 | 1 | 0 | 0 | 0 | 1 | ↑T↑FB | 0x0F |
| 1 | 0 | 0 | 1 | 0 | 0 | 1 | 0 | ↑T | 0x08 |
| 1 | 0 | 0 | 1 | 0 | 0 | 1 | 1 | ↑T↓FB | 0x0F |
| 1 | 0 | 0 | 1 | 0 | 1 | 0 | 0 | ↑T↑B | 0x06 |
| 1 | 0 | 0 | 1 | 0 | 1 | 0 | 1 | ↑T↑B↑FB | 0x0F |
| 1 | 0 | 0 | 1 | 0 | 1 | 1 | 0 | ↑T↑B | 0x06 |
| 1 | 0 | 0 | 1 | 0 | 1 | 1 | 1 | ↑T↑B↓FB | 0x0F |
| 1 | 0 | 0 | 1 | 1 | 0 | 0 | 0 | ↑T | 0x08 |
| 1 | 0 | 0 | 1 | 1 | 0 | 0 | 1 | ↑T↑FB | 0x0F |
| 1 | 0 | 0 | 1 | 1 | 0 | 1 | 0 | ↑T | 0x08 |
| 1 | 0 | 0 | 1 | 1 | 0 | 1 | 1 | ↑T↓FB | 0x0F |
| 1 | 0 | 0 | 1 | 1 | 1 | 0 | 0 | ↑T↓B↑FB | 0x0F |
| 1 | 0 | 0 | 1 | 1 | 1 | 0 | 1 | ↑T↓FB | 0x0F |
| 1 | 0 | 0 | 1 | 1 | 1 | 1 | 0 | ↑T↓B | 0x0F |
| 1 | 0 | 0 | 1 | 1 | 1 | 1 | 1 | ↑T↓B↓FB | 0x0F |
| 1 | 0 | 1 | 0 | 0 | 0 | 0 | 0 | Flat | 0x0E |
| 1 | 0 | 1 | 0 | 0 | 0 | 0 | 1 | ↑FB | 0x00 |
| 1 | 0 | 1 | 0 | 0 | 0 | 1 | 0 | Flat | 0x0E |
| 1 | 0 | 1 | 0 | 0 | 0 | 1 | 1 | ↓FB | 0x01 |
| 1 | 0 | 1 | 0 | 0 | 1 | 0 | 0 | ↑B | 0x04 |
| 1 | 0 | 1 | 0 | 0 | 1 | 0 | 1 | ↑B↑FB | 0x02 |
| 1 | 0 | 1 | 0 | 0 | 1 | 1 | 0 | ↑B | 0x04 |
| 1 | 0 | 1 | 0 | 0 | 1 | 1 | 1 | ↑B↓FB | 0x0F |
| 1 | 0 | 1 | 0 | 1 | 0 | 0 | 0 | Flat | 0x0E |
| 1 | 0 | 1 | 0 | 1 | 0 | 0 | 1 | ↑FB | 0x00 |
| 1 | 0 | 1 | 0 | 1 | 0 | 1 | 0 | Flat | 0x0E |
| 1 | 0 | 1 | 0 | 1 | 0 | 1 | 1 | ↓FB | 0x01 |
| 1 | 0 | 1 | 0 | 1 | 1 | 0 | 0 | ↓B | 0x05 |
| 1 | 0 | 1 | 0 | 1 | 1 | 0 | 1 | ↓B↑FB | 0x0F |
| 1 | 0 | 1 | 0 | 1 | 1 | 1 | 0 | ↓B | 0x05 |
| 1 | 0 | 1 | 0 | 1 | 1 | 1 | 1 | ↓B↓FB | 0x03 |
| 1 | 0 | 1 | 1 | 0 | 0 | 0 | 0 | ↓T | 0x09 |
| 1 | 0 | 1 | 1 | 0 | 0 | 0 | 1 | ↓T↑FB | 0x0F |
| 1 | 0 | 1 | 1 | 0 | 0 | 1 | 0 | ↓T | 0x09 |
| 1 | 0 | 1 | 1 | 0 | 0 | 1 | 1 | ↓T↓FB | 0x0F |
| 1 | 0 | 1 | 1 | 0 | 1 | 0 | 0 | ↓T↑B | 0x0F |
| 1 | 0 | 1 | 1 | 0 | 1 | 0 | 1 | ↓T↑B↑FB | 0x0F |
| 1 | 0 | 1 | 1 | 0 | 1 | 1 | 0 | ↓T↑B | 0x0F |
| 1 | 0 | 1 | 1 | 0 | 1 | 1 | 1 | ↓T↑B↓FB | 0x0F |
| 1 | 0 | 1 | 1 | 1 | 0 | 0 | 0 | ↓T | 0x09 |
| 1 | 0 | 1 | 1 | 1 | 0 | 0 | 1 | ↓T↑FB | 0x0F |
| 1 | 0 | 1 | 1 | 1 | 0 | 1 | 0 | ↓T | 0x09 |
| 1 | 0 | 1 | 1 | 1 | 0 | 1 | 1 | ↓T↓FB | 0x0F |
| 1 | 0 | 1 | 1 | 1 | 1 | 0 | 0 | ↓T↓B | 0x07 |
| 1 | 0 | 1 | 1 | 1 | 1 | 0 | 1 | ↓T↓B↑FB | 0x0F |
| 1 | 0 | 1 | 1 | 1 | 1 | 1 | 0 | ↓T↓B | 0x07 |
| 1 | 0 | 1 | 1 | 1 | 1 | 1 | 1 | ↓T↓B↓FB | 0x0F |
| 1 | 1 | 0 | 0 | 0 | 0 | 0 | 0 | ↓FT | 0x0D |
| 1 | 1 | 0 | 0 | 0 | 0 | 0 | 1 | ↓FT↑FB | 0x0F |
| 1 | 1 | 0 | 0 | 0 | 0 | 1 | 0 | ↓FT | 0x0D |
| 1 | 1 | 0 | 0 | 0 | 0 | 1 | 1 | ↓FT↓FB | 0x0F |
| 1 | 1 | 0 | 0 | 0 | 1 | 0 | 0 | ↓FT↑B | 0x0F |
| 1 | 1 | 0 | 0 | 0 | 1 | 0 | 1 | ↓FT↑B↑FB | 0x0F |
| 1 | 1 | 0 | 0 | 0 | 1 | 1 | 0 | ↓FT↑B | 0x0F |
| 1 | 1 | 0 | 0 | 0 | 1 | 1 | 1 | ↓FT↑B↓FB | 0x0F |
| 1 | 1 | 0 | 0 | 1 | 0 | 0 | 0 | ↓FT | 0x0D |
| 1 | 1 | 0 | 0 | 1 | 0 | 0 | 1 | ↓FT↑FB | 0x0F |
| 1 | 1 | 0 | 0 | 1 | 0 | 1 | 0 | ↓FT | 0x0D |
| 1 | 1 | 0 | 0 | 1 | 0 | 1 | 1 | ↓FT↓FB | 0x0F |
| 1 | 1 | 0 | 0 | 1 | 1 | 0 | 0 | ↓FT↓B | 0x0F |

TABLE 4-continued

Alternative Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 1 | 1 | 0 | 0 | 1 | 1 | 0 | 1 | ↓FT↓B↑FB | 0x0F |
| 1 | 1 | 0 | 0 | 1 | 1 | 1 | 0 | ↓FT↓B | 0x0F |
| 1 | 1 | 0 | 0 | 1 | 1 | 1 | 1 | ↓FT↓B↓FB | 0x0F |
| 1 | 1 | 0 | 1 | 0 | 0 | 0 | 0 | ↓FT↑T | 0x0F |
| 1 | 1 | 0 | 1 | 0 | 0 | 0 | 1 | ↓FT↑T↑FB | 0x0F |
| 1 | 1 | 0 | 1 | 0 | 0 | 1 | 0 | ↓FT↑T | 0x0F |
| 1 | 1 | 0 | 1 | 0 | 0 | 1 | 1 | ↓FT↑T↓FB | 0x0F |
| 1 | 1 | 0 | 1 | 0 | 1 | 0 | 0 | ↓FT↑T↑B | 0x0F |
| 1 | 1 | 0 | 1 | 0 | 1 | 0 | 1 | ↓FT↑T↑B↑FB | 0x0F |
| 1 | 1 | 0 | 1 | 0 | 1 | 1 | 0 | ↓FT↑T↑B | 0x0F |
| 1 | 1 | 0 | 1 | 0 | 1 | 1 | 1 | ↓FT↑T↑B↓FB | 0x0F |
| 1 | 1 | 0 | 1 | 1 | 0 | 0 | 0 | ↓FT↑T | 0x0F |
| 1 | 1 | 0 | 1 | 1 | 0 | 0 | 1 | ↓FT↑T↑FB | 0x0F |
| 1 | 1 | 0 | 1 | 1 | 0 | 1 | 0 | ↓FT↑T | 0x0F |
| 1 | 1 | 0 | 1 | 1 | 0 | 1 | 1 | ↓FT↑T↓FB | 0x0F |
| 1 | 1 | 0 | 1 | 1 | 1 | 0 | 0 | ↓FT↑T↓B | 0x0F |
| 1 | 1 | 0 | 1 | 1 | 1 | 0 | 1 | ↓FT↑T↓B↑FB | 0x0F |
| 1 | 1 | 0 | 1 | 1 | 1 | 1 | 0 | ↓FT↑T↓B | 0x0F |
| 1 | 1 | 0 | 1 | 1 | 1 | 1 | 1 | ↓FT↑T↓B↓FB | 0x0F |
| 1 | 1 | 1 | 0 | 0 | 0 | 0 | 0 | ↓FT | 0x0D |
| 1 | 1 | 1 | 0 | 0 | 0 | 0 | 1 | ↓FT↑FB | 0x0F |
| 1 | 1 | 1 | 0 | 0 | 0 | 1 | 0 | ↓FT | 0x0D |
| 1 | 1 | 1 | 0 | 0 | 0 | 1 | 1 | ↓FT↓FB | 0x0F |
| 1 | 1 | 1 | 0 | 0 | 1 | 0 | 0 | ↓FT↑B | 0x0F |
| 1 | 1 | 1 | 0 | 0 | 1 | 0 | 1 | ↓FT↑B↑FB | 0x0F |
| 1 | 1 | 1 | 0 | 0 | 1 | 1 | 0 | ↓FT↑B | 0x0F |
| 1 | 1 | 1 | 0 | 0 | 1 | 1 | 1 | ↓FT↑B↓FB | 0x0F |
| 1 | 1 | 1 | 0 | 1 | 0 | 0 | 0 | ↓FT | 0x0D |
| 1 | 1 | 1 | 0 | 1 | 0 | 0 | 1 | ↓FT↑FB | 0x0F |
| 1 | 1 | 1 | 0 | 1 | 0 | 1 | 0 | ↓FT | 0x0D |
| 1 | 1 | 1 | 0 | 1 | 0 | 1 | 1 | ↓FT↓FB | 0x0F |
| 1 | 1 | 1 | 0 | 1 | 1 | 0 | 0 | ↓FT↓B | 0x0F |
| 1 | 1 | 1 | 0 | 1 | 1 | 0 | 1 | ↓FT↓B↑FB | 0x0F |
| 1 | 1 | 1 | 0 | 1 | 1 | 1 | 0 | ↓FT↓B | 0x0F |
| 1 | 1 | 1 | 0 | 1 | 1 | 1 | 1 | ↓FT↓B↓FB | 0x0F |
| 1 | 1 | 1 | 1 | 0 | 0 | 0 | 0 | ↓FT↓T | 0x0B |
| 1 | 1 | 1 | 1 | 0 | 0 | 0 | 1 | ↓FT↓T↑FB | 0x0F |
| 1 | 1 | 1 | 1 | 0 | 0 | 1 | 0 | ↓FT↓T | 0x0B |
| 1 | 1 | 1 | 1 | 0 | 0 | 1 | 1 | ↓FT↓T↓FB | 0x0F |
| 1 | 1 | 1 | 1 | 0 | 1 | 0 | 0 | ↓FT↓T↑B | 0x0F |
| 1 | 1 | 1 | 1 | 0 | 1 | 0 | 1 | ↓FT↓T↑B↑FB | 0x0F |
| 1 | 1 | 1 | 1 | 0 | 1 | 1 | 0 | ↓FT↓T↑B | 0x0F |
| 1 | 1 | 1 | 1 | 0 | 1 | 1 | 1 | ↓FT↓T↑B↓FB | 0x0F |
| 1 | 1 | 1 | 1 | 1 | 0 | 0 | 0 | ↓FT↓T | 0x0B |
| 1 | 1 | 1 | 1 | 1 | 0 | 0 | 1 | ↓FT↓T↑FB | 0x0F |
| 1 | 1 | 1 | 1 | 1 | 0 | 1 | 0 | ↓FT↓T | 0x0B |
| 1 | 1 | 1 | 1 | 1 | 0 | 1 | 1 | ↓FT↓T↓FB | 0x0F |
| 1 | 1 | 1 | 1 | 1 | 1 | 0 | 0 | ↓FT↓T↓B | 0x0F |
| 1 | 1 | 1 | 1 | 1 | 1 | 0 | 1 | ↓FT↓T↓B↑FB | 0x0F |
| 1 | 1 | 1 | 1 | 1 | 1 | 1 | 0 | ↓FT↓T↓B | 0x0F |
| 1 | 1 | 1 | 1 | 1 | 1 | 1 | 1 | ↓FT↓T↓B↓FB | 0x0F |

FIG. 7 shows an example digital image 700 and a resultant image plane of codes 720 as produced by an edge identification process 710 as diagrammatically illustrated in FIG. 6. The image 700 is a square of pixels with the pixels interior to the square each possessing a value of 255 and the anti-aliased edge pixels possessing intermediate gray values. The square is positioned within a field of pixels each possessing a value of 0. The image is input to the edge identification process 710 to produce edge identification codes, each shown in hexadecimal form in the image plane of codes 720. As can be seen in the example, the codes 720 differentiate inside edge, outside edge, vertical edge, horizontal edge, and positions about a corner. This edge information can be used to provide beneficial rendering for these edge pixels.

Figure 8:
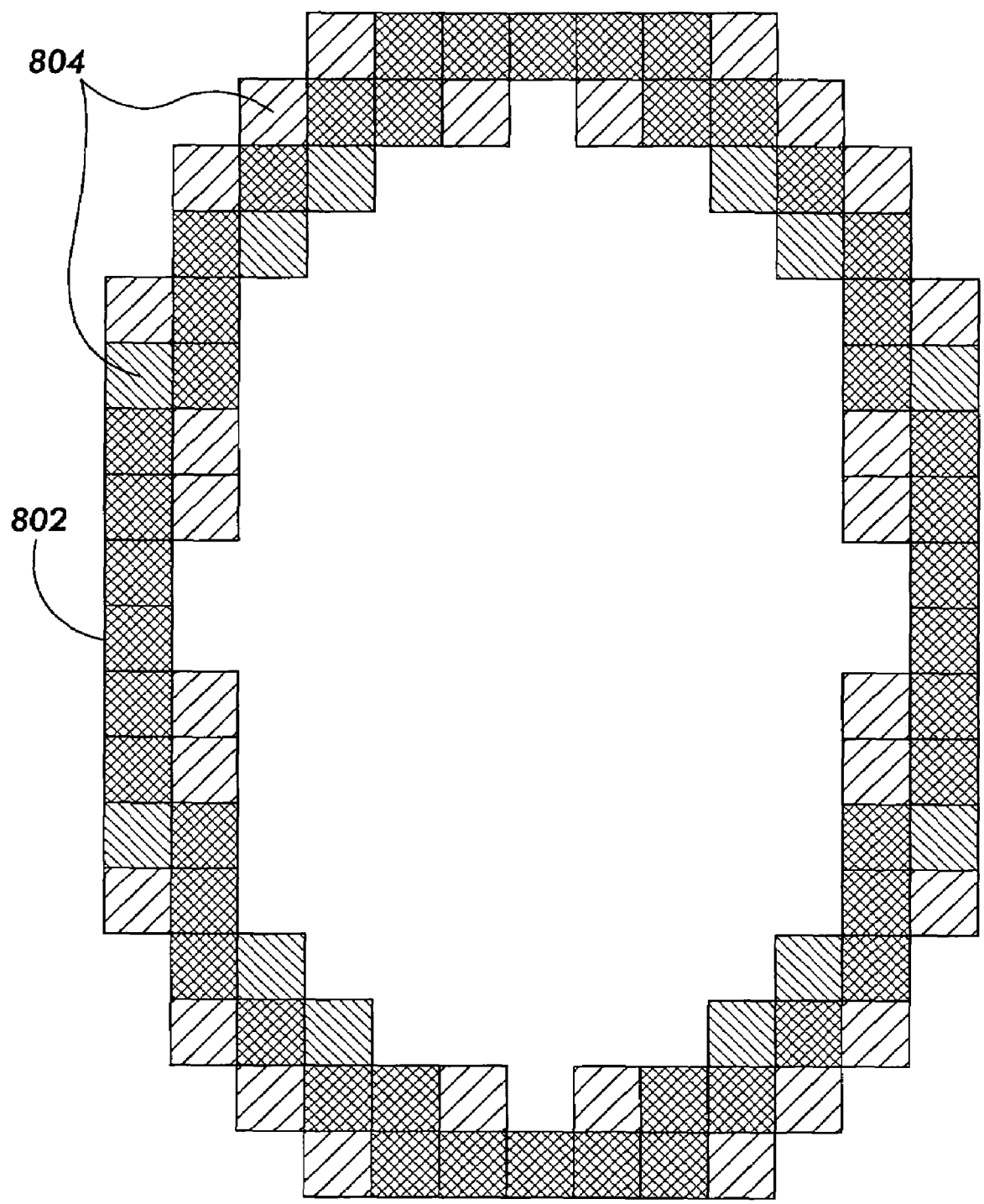
FIG. 8 is an exemplary input digital image of the typographic numeral "0" possessing anti-aliased pixels.
Figure 9:
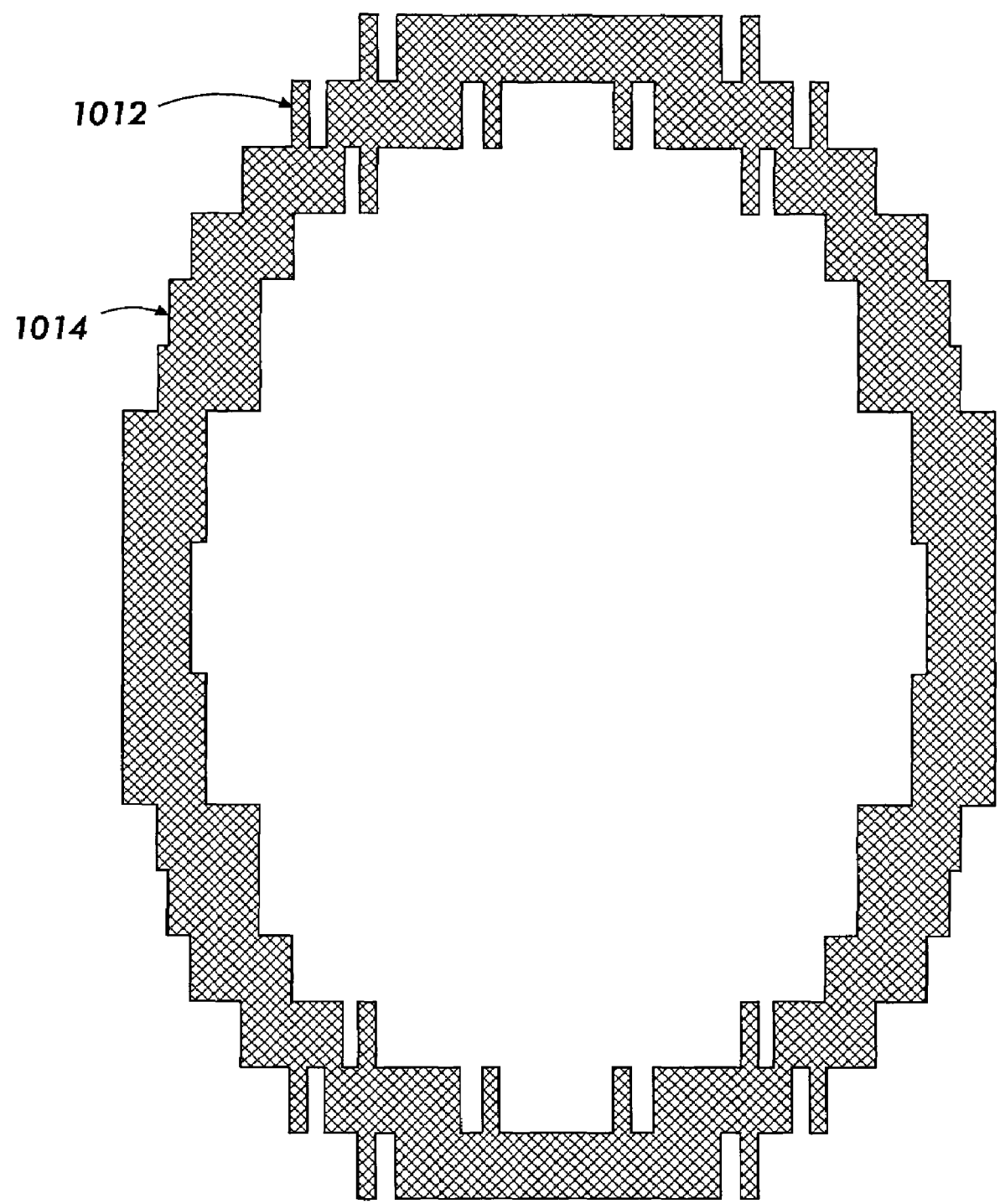
FIG. 9 is an output digital image rendered with specialized anti-aliased rendering signals according to the teachings presented herein.
Figure 10:
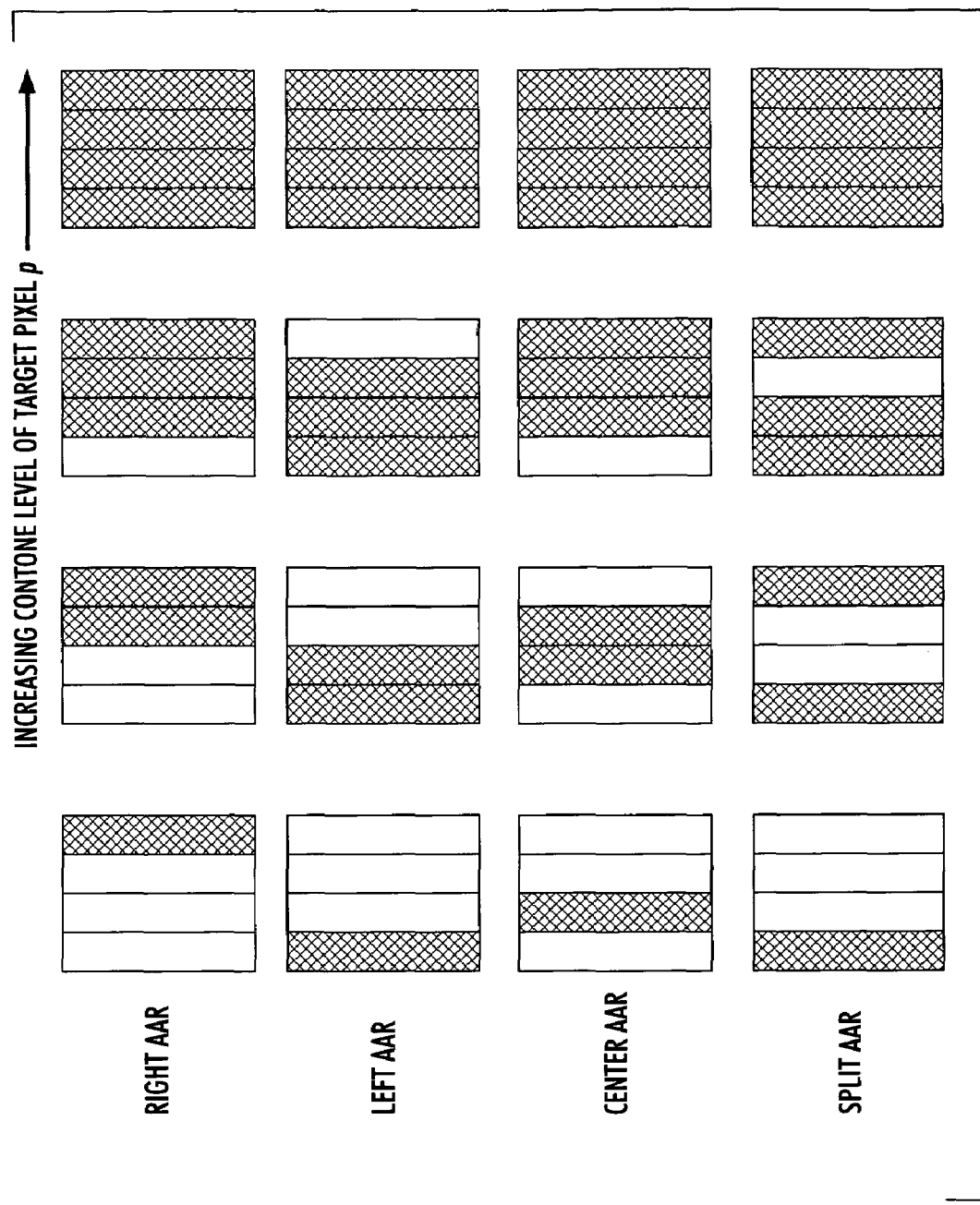
FIG. 10 shows one collection of possible rendering signals for pixels that were tagged as anti-aliased.
Figure 11:
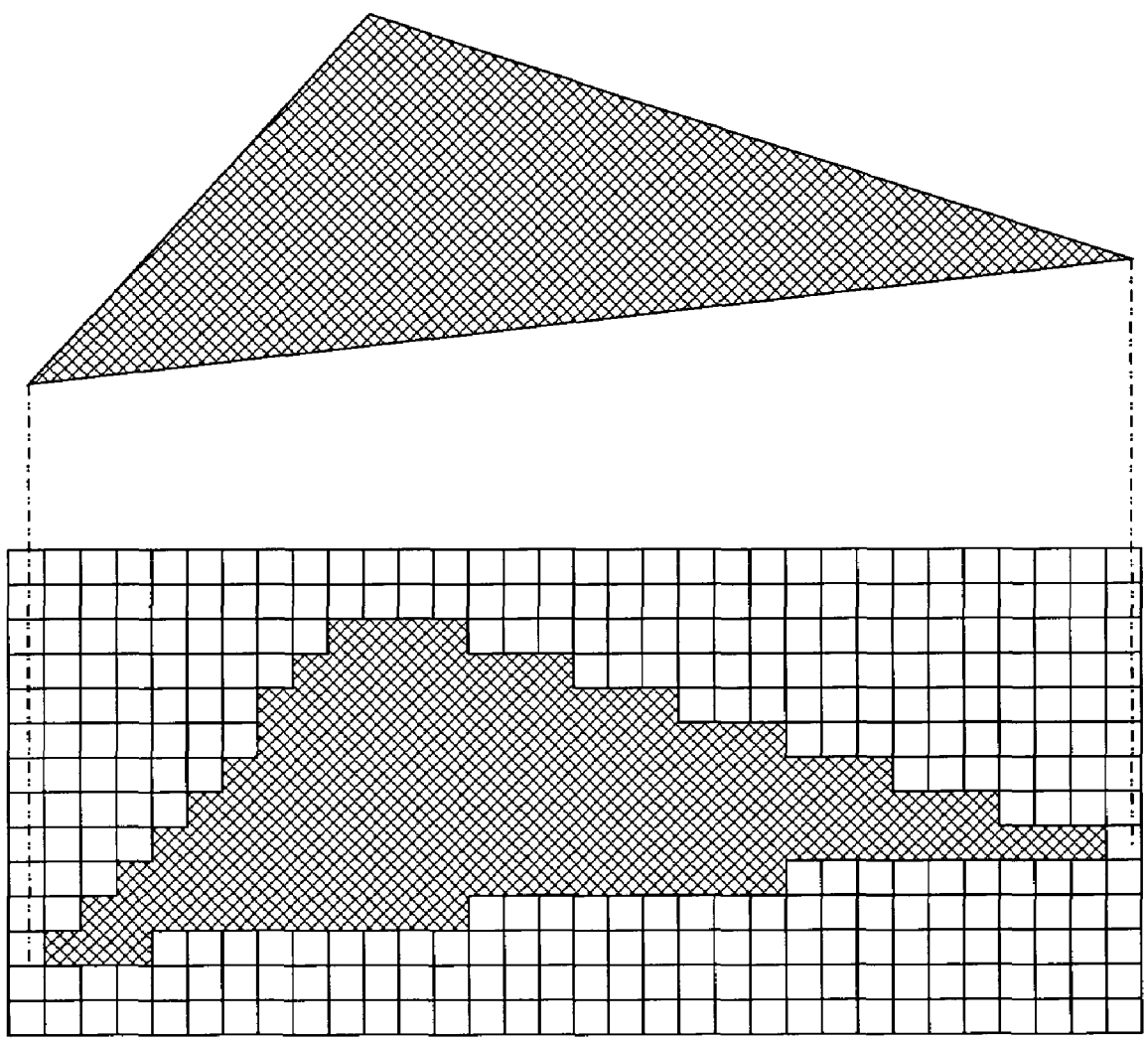
FIG. 11 is an illustration of a potential effect of aliasing in a digitized document image.

An example of anti-aliased rendering is shown in FIGS. 8 and 9. FIG. 8 shows an anti-aliased digital image of a numeric zero "0." Pixels whose values are unaffected by anti-aliasing are indicated by cross-hatching 802, while pixels whose values are gray due to anti-aliasing are denoted by diagonal line shading 804. The rendering is performed using 4× high addressable pixels. The high addressable pixels used for AAR are shown in FIG. 10. The resultant rendered image is shown in FIG. 9.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image processing method for rendering anti-aliased pixels within a digital image, comprising:
    receiving a digital image into an image processing system,
    a) selecting a target pixel location within the digital image;
    b) observing a set of pixels within a pixel observation window superimposed on the digital image, relative to the target pixel location;
    c) generating a plurality of sums of weighted pixels values where each sum is taken over a vector of pixels in the pixel observation window,
    d) generating vector-sum-to-vector-sum differences using the plurality of sums, where the differences are taken for neighboring pairs of vectors, where the pairs of vectors are of at least two different orientations;
    e) generating an edge-slope state for each pair of neighboring vectors of pixels;
    f) generating a polarity of edge-state codes from a plurality of edge slope states;
    g) generating edge-identification codes from the plurality of edge-state codes using at least one look-up table; and,
    h) utilizing the edge-identification codes to select and apply anti-aliased rendering to the digital image at the target pixel: and,
    repeating steps a) through h) above until all pixel locations of the digital image have been targeted, and the resulting processed image from repeating those steps, is printed by a print engine.

2. The method of claim 1 where the anti-aliased pixel was anti-aliased by one of a super resolution anti-aliasing process, and a physical scanning and digitizing process.

3. The method of claim 2, wherein the anti-aliased rendering utilizes special rendering pixel signals for at least one of anti-aliased pixels that possess high contrast neighbors, anti-aliased pixels that are fine features, anti-aliased pixels that are edge pixels of gray image objects.

4. The method of claim 2, wherein the digital image is composed of pixels possessing contone values.

5. The method of claim 2, wherein the digital image is a color separation of a digital color image.

6. An image processing method for producing a rendered digital image using anti-aliased rendering and conventional halftoning, comprising:
    receiving a digital image into an image processing system,
    a) observing a set of pixels within a pixel observation window superimposed on the digital image, relative to a target pixel location;
    b) generating a plurality of sums of weighted pixels values where each sum is taken over a vector of pixels in the pixel observation window;
    c) generating vector-sum-to-vector-sum differences using the plurality of sums, where the differences are taken for neighboring pairs of vectors;
    d) generating an edge-slope state for each pair of neighboring vectors of pixels by using one or more bits to encode a magnitude and one bit to encode a sign of the vector-sum-to-vector-sum differences, where encoding the magnitude of the sum-to-sum differences utilizes thresholds that are set to enable identification of anti-aliased pixels that have been anti-aliased using a super resolution anti-aliasing process;
    e) generating a plurality of edge-state codes from a plurality of edge slope states;
    f) generating edge-identification codes from the plurality of edge-state codes using at least one look-up table; wherein the edge-identification codes indicate proximity to a edge; and,
    g) utilizing the edge-identification codes to select and apply to the digital image at the target pixel either anti-aliased rendering or conventional halftoning: and,
    repeating steps a) through g) above until all pixel locations of the digital image have been targeted, and the resulting processed image from repeating those steps, is then printed by a print engine.

7. The method of claim 6 wherein the plurality of vectors are aligned at a first orientation.

8. The method of claim 6 wherein the plurality of vectors are aligned at a plurality of orientations.

9. The method of claim 8 wherein the plurality of orientations is taken from vertical, horizontal, diagonal left, diagonal right.

10. The method of claim 8 wherein each orientation of the plurality of orientations is used to generate an orientated-edge-identification code, and the bits forming the orientated-edge-identification codes are used to form an address into a look-up table that points to the edge identification code.

* * * * *